(12) United States Patent
Rosedale

(10) Patent No.: US 10,924,566 B2
(45) Date of Patent: *Feb. 16, 2021

(54) USE OF CORROBORATION TO GENERATE REPUTATION SCORES WITHIN VIRTUAL REALITY ENVIRONMENTS

(71) Applicant: High Fidelity, Inc., San Francisco, CA (US)

(72) Inventor: Philip Rosedale, San Francisco, CA (US)

(73) Assignee: High Fidelity, Inc., San Francisco, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 15/983,425

(22) Filed: May 18, 2018

(65) Prior Publication Data

US 2019/0356745 A1    Nov. 21, 2019

(51) Int. Cl.
*H04L 29/08* (2006.01)
*G06F 3/01* (2006.01)
(Continued)

(52) U.S. Cl.
CPC .............. *H04L 67/22* (2013.01); *G06F 3/011* (2013.01); *G06F 3/017* (2013.01); *G06T 19/003* (2013.01); *H04L 67/38* (2013.01); *H04N 7/157* (2013.01)

(58) Field of Classification Search
CPC ......... H04L 67/22; H04L 67/38; H04N 7/157; G06F 3/011; G06F 3/017; G06T 19/003
See application file for complete search history.

(56) References Cited

U.S. PATENT DOCUMENTS 5,884,029 A    3/1999    Brush, II
6,396,509 B1 *  5/2002    Cheng ................... G06F 3/011
                                                        715/706
(Continued)

FOREIGN PATENT DOCUMENTS

WO    WO-2015183771 A1 *  12/2015    ......... G07F 17/3272

OTHER PUBLICATIONS

Final Office Action dated Nov. 7, 2019, U.S. Appl. No. 15/983,373, filed May 18, 2018.
(Continued)

*Primary Examiner* — Dhairya A Patel
*Assistant Examiner* — Sandarva Khanal
(74) *Attorney, Agent, or Firm* — Vierra Magen Marcus LLP

(57) ABSTRACT

Embodiments described herein reduce the probability that a user of a VR environment can nefariously rig a system to positively and/or negatively influence another user's reputation score. Information indicative of a positive or negative interaction between an avatar of a first user and an avatar of a second user is received from a client computing device used by the first user. Further information is received from a client computing device used by a third user of the VR environment, and based thereon, there is a determination whether the positive or negative interaction is corroborated or contradicted. If corroborated, a reputation score associated with the second user is increased or decreased. If contradicted, the reputation score associated with the second user is not adjusted, and the reputation score of the first user may be decreased. Such reputation scores can be accessed and used by a user using a client computing device.

8 Claims, 9 Drawing Sheets

(51) Int. Cl.
  *H04L 29/06* (2006.01)
  *H04N 7/15* (2006.01)
  *G06T 19/00* (2011.01)

(56) References Cited

U.S. PATENT DOCUMENTS

| | | | |
|---|---|---|---|
| 6,409,599 B1 | 6/2002 | Sprout et al. | |
| 7,386,799 B1 | 6/2008 | Clanton et al. | |
| 8,010,460 B2 | 8/2011 | Work et al. | |
| 8,026,918 B1 | 9/2011 | Murphy | |
| 8,060,829 B2 | 11/2011 | Jung et al. | |
| 8,099,668 B2 | 1/2012 | Garbow et al. | |
| 8,185,829 B2 | 5/2012 | Cannon et al. | |
| 8,214,905 B1* | 7/2012 | Doukhvalov | G06F 21/577 726/24 |
| 8,226,485 B1 | 7/2012 | Mooney et al. | |
| 8,296,356 B2 | 10/2012 | Obasanjo et al. | |
| 8,312,511 B2 | 11/2012 | Garbow et al. | |
| 8,346,898 B2 | 1/2013 | Marcus et al. | |
| 8,464,166 B2 | 6/2013 | Ganz et al. | |
| 8,516,380 B2 | 8/2013 | Bates et al. | |
| 8,600,779 B2 | 12/2013 | Booth et al. | |
| 8,635,098 B2 | 1/2014 | Ratterman et al. | |
| 8,677,254 B2 | 3/2014 | Inn et al. | |
| 8,713,450 B2* | 4/2014 | Garbow | G06F 21/316 705/325 |
| 8,756,304 B2 | 6/2014 | Leacock et al. | |
| 8,881,030 B2 | 11/2014 | Jones et al. | |
| 8,898,233 B2 | 11/2014 | Ganetakos et al. | |
| 8,913,063 B2 | 12/2014 | Yockey | |
| 8,977,960 B2 | 3/2015 | Vuguer et al. | |
| 9,069,945 B2 | 6/2015 | Singh | |
| 9,120,019 B2 | 9/2015 | Mescon et al. | |
| 9,195,748 B2 | 11/2015 | Angulo et al. | |
| 9,244,588 B2 | 1/2016 | Begosa et al. | |
| 9,245,177 B2 | 1/2016 | Perez | |
| 9,259,648 B2 | 2/2016 | Hoomani et al. | |
| 9,274,598 B2 | 3/2016 | Beymer et al. | |
| 9,300,612 B2 | 3/2016 | Bates et al. | |
| 9,336,281 B2 | 5/2016 | Angulo et al. | |
| 9,336,282 B2 | 5/2016 | Angulo et al. | |
| 9,358,468 B2 | 6/2016 | Yockey | |
| 9,363,283 B1 | 6/2016 | Herrera-Yague et al. | |
| 9,420,051 B2 | 8/2016 | Obasanjo et al. | |
| 9,628,430 B2 | 4/2017 | Shapero et al. | |
| 9,697,535 B2 | 7/2017 | Dawson et al. | |
| 9,700,804 B2 | 7/2017 | Dawson et al. | |
| 9,756,006 B2 | 9/2017 | Shapero et al. | |
| 9,813,522 B2 | 11/2017 | Van Wie | |
| 9,987,563 B2 | 6/2018 | Jones et al. | |
| 10,165,261 B2 | 12/2018 | Valdivia et al. | |
| 10,279,272 B2 | 5/2019 | Hoomani et al. | |
| 10,531,043 B2 | 1/2020 | Moody | |
| 2004/0038739 A1 | 2/2004 | Wanat | |
| 2006/0042483 A1 | 3/2006 | Work et al. | |
| 2006/0123127 A1 | 6/2006 | Littlefield | |
| 2007/0063999 A1 | 3/2007 | Park | |
| 2007/0129123 A1* | 6/2007 | Eryou | A63F 13/12 463/1 |
| 2008/0077517 A1 | 3/2008 | Sappington | |
| 2008/0146349 A1 | 6/2008 | Lee et al. | |
| 2008/0201597 A1 | 9/2008 | Harrison et al. | |
| 2008/0215581 A1 | 9/2008 | Messing et al. | |
| 2008/0287188 A1* | 11/2008 | Riera Jorba | G07F 17/32 463/29 |
| 2008/0303811 A1 | 12/2008 | Van Luchene | |
| 2009/0063630 A1 | 3/2009 | Obasanjo et al. | |
| 2009/0079816 A1 | 3/2009 | Qvarfordt et al. | |
| 2009/0113022 A1 | 4/2009 | Quoc et al. | |
| 2009/0163278 A1* | 6/2009 | Kawanaka | A63F 13/12 463/40 |
| 2009/0170604 A1 | 7/2009 | Mueller et al. | |
| 2009/0210803 A1* | 8/2009 | Brignull | H04L 69/24 715/757 |
| 2009/0240359 A1* | 9/2009 | Hyndman | H04L 65/4015 700/94 |
| 2010/0023879 A1* | 1/2010 | Finn | G06F 3/048 715/757 |
| 2010/0081508 A1 | 4/2010 | Bhogal et al. | |
| 2010/0083112 A1 | 4/2010 | Dawson et al. | |
| 2010/0169796 A1* | 7/2010 | Lynk | A63F 13/10 715/757 |
| 2010/0175002 A1 | 7/2010 | Cannon et al. | |
| 2010/0275141 A1 | 10/2010 | Scherpa et al. | |
| 2011/0060744 A1 | 3/2011 | Brignull et al. | |
| 2011/0165939 A1 | 7/2011 | Borst et al. | |
| 2011/0244954 A1 | 10/2011 | Goldman et al. | |
| 2012/0036127 A1 | 2/2012 | Work et al. | |
| 2012/0131105 A1 | 5/2012 | Rortvedt | |
| 2012/0209912 A1 | 8/2012 | Brown | |
| 2012/0226701 A1 | 9/2012 | Singh | |
| 2013/0041717 A1 | 2/2013 | Ratterman et al. | |
| 2013/0110952 A1 | 5/2013 | Dawson et al. | |
| 2013/0125026 A1 | 5/2013 | Gaume | |
| 2013/0132479 A1 | 5/2013 | Obasanjo et al. | |
| 2013/0194259 A1 | 8/2013 | Bennett et al. | |
| 2013/0212033 A1 | 8/2013 | Work et al. | |
| 2013/0218865 A1 | 8/2013 | Angulo et al. | |
| 2013/0226910 A1 | 8/2013 | Work et al. | |
| 2013/0252737 A1* | 9/2013 | Mescon | A63F 13/798 463/42 |
| 2013/0254192 A1 | 9/2013 | Work et al. | |
| 2013/0282427 A1* | 10/2013 | Dvorak | G06Q 50/01 705/7.29 |
| 2013/0290325 A1 | 10/2013 | Work et al. | |
| 2013/0290420 A1 | 10/2013 | Work et al. | |
| 2013/0290448 A1 | 10/2013 | Work et al. | |
| 2013/0297589 A1 | 11/2013 | Work et al. | |
| 2014/0092005 A1* | 4/2014 | Anderson | G06F 3/011 345/156 |
| 2014/0214941 A1 | 7/2014 | Shapero et al. | |
| 2014/0214943 A1 | 7/2014 | Shapero et al. | |
| 2014/0258288 A1 | 9/2014 | Work et al. | |
| 2014/0267564 A1* | 9/2014 | Pourashraf | G06N 3/006 348/14.08 |
| 2014/0317126 A1 | 10/2014 | Work et al. | |
| 2014/0344718 A1 | 11/2014 | Rapaport et al. | |
| 2015/0150141 A1 | 5/2015 | Szymanski et al. | |
| 2015/0205800 A1 | 7/2015 | Work et al. | |
| 2015/0205872 A1 | 7/2015 | Work et al. | |
| 2015/0215351 A1 | 7/2015 | Barzuza et al. | |
| 2015/0269165 A1 | 9/2015 | Work et al. | |
| 2015/0269530 A1 | 9/2015 | Work et al. | |
| 2015/0271289 A1 | 9/2015 | Work et al. | |
| 2015/0278223 A1 | 10/2015 | Work et al. | |
| 2015/0278290 A1 | 10/2015 | Work et al. | |
| 2015/0278964 A1 | 10/2015 | Work et al. | |
| 2016/0041988 A1 | 2/2016 | Angulo et al. | |
| 2016/0042373 A1 | 2/2016 | Angulo et al. | |
| 2016/0227172 A1* | 8/2016 | Safaei | H04N 19/48 |
| 2016/0300252 A1 | 10/2016 | Frank et al. | |
| 2016/0357261 A1 | 12/2016 | Bristol et al. | |
| 2017/0024473 A1 | 1/2017 | Angulo et al. | |
| 2017/0186103 A1 | 6/2017 | Lorenzo et al. | |
| 2018/0095616 A1 | 4/2018 | Valdivia et al. | |
| 2018/0095617 A1 | 4/2018 | Valdivia et al. | |
| 2018/0095618 A1 | 4/2018 | Valdivia et al. | |
| 2018/0095635 A1 | 4/2018 | Valdivia et al. | |
| 2018/0095636 A1 | 4/2018 | Valdivia et al. | |
| 2018/0095637 A1 | 4/2018 | Valdivia et al. | |
| 2018/0095648 A1 | 4/2018 | Valdivia et al. | |
| 2018/0095649 A1 | 4/2018 | Valdivia et al. | |
| 2018/0096504 A1 | 4/2018 | Valdivia et al. | |
| 2018/0096505 A1 | 4/2018 | Valdivia et al. | |
| 2018/0096506 A1 | 4/2018 | Valdivia et al. | |
| 2018/0096507 A1 | 4/2018 | Valdivia et al. | |
| 2018/0096508 A1 | 4/2018 | Valdivia et al. | |
| 2018/0096526 A1 | 4/2018 | Valdivia et al. | |
| 2018/0101293 A1* | 4/2018 | Fang | G06F 3/04883 |
| 2018/0348863 A1* | 12/2018 | Aimone | A61B 5/0476 |
| 2019/0052471 A1 | 2/2019 | Panattoni et al. | |

(56) References Cited

U.S. PATENT DOCUMENTS

2019/0096106 A1* 3/2019 Shapiro ............... G06F 3/017
2019/0098291 A1 3/2019 Valdivia et al.
2019/0306241 A1* 10/2019 Amacker ............. G06Q 50/30

OTHER PUBLICATIONS

Non-final Office Action dated Jul. 29, 2019, U.S. Appl. No. 15/983,328, filed May 18, 2018.
Response to Office Action dated Oct. 8, 2019, U.S. Appl. No. 15/983,328, filed May 18, 2018.
Response to Office Action dated Oct. 8, 2019, U.S. Appl. No. 15/983,373, filed May 18, 2018.
Final Office Action dated Jan. 29, 2020, U.S. Appl. No. 15/983,328, filed May 18, 2018.
Response to Office Action dated Feb. 5, 2020, U.S. Appl. No. 15/983,373.
Non-final Office Action dated Aug. 16, 2019, U.S. Appl. No. 15/983,373, filed May 18, 2018.
U.S. Appl. No. 15/983,328, filed May 18, 2018.
U.S. Appl. No. 15/983,373, filed May 18, 2018.
Response to Office Action dated May 29, 2020, U.S. Appl. No. 15/983,328, filed May 18, 2018.
Non-final Office Action dated Aug. 21, 2020, U.S. Appl. No. 15/983,373, filed May 18, 2018.
Non-final Office Action dated Oct. 6, 2020, U.S. Appl. No. 15/983,328, filed May 18, 2018.

* cited by examiner

USE OF CORROBORATION TO GENERATE REPUTATION SCORES WITHIN VIRTUAL REALITY ENVIRONMENTS

RELATED APPLICATIONS

This application is related to the following commonly invented and commonly assigned patent applications, each of which is incorporated herein by reference: U.S. patent application Ser. No. 15/983,328, filed May 18, 2018, which is titled USE OF GESTURES TO GENERATE REPUTATION SCORES WITHIN VIRTUAL REALITY ENVIRONMENTS; and U.S. patent application Ser. No. 15/983,373, filed May 18, 2018, which is titled GENERATION OF RELATIVE REPUTATION SCORES WITHIN VIRTUAL REALITY ENVIRONMENTS.

FIELD OF THE INVENTION

Embodiments of the present invention generally relate to multi-user computer implemented virtual reality (VR) environments, and more particularly to systems and methods that can be used to determine reputation scores within VR environments, as well as to access and use such reputation scores within VR environments.

BACKGROUND

In multi-user computer implemented virtual reality (VR) environments it is often desirable for people to use identities (aka Avatars) that are not tied to their real-world identities. This is one of the main allures of multi-user computer implemented VR environments, which are often referred to herein more succinctly as VR environments. Additionally, because VR environments are global, an individual that explores or otherwise participates in a VR environment is likely to meet many other people (each represented by respective Avatar) that the individual does not know in the real world. Accordingly, it is often difficult for an individual (aka a user) that is participating in a VR environment to determine whether they should have certain interactions with other individuals (i.e., other users) within the VR environment, because the individual may not know whether the other individuals are trustworthy. Exemplary interactions that a user within a VR environment may have with another user of the VR environment includes: performing a financial transaction with the other user; allowing the other user to enter a secure area (e.g., a virtual home or virtual store) or event (e.g., a virtual meeting, virtual party, or virtual conference); and granting the other user permission to edit a portion of a VR environment; just to name a few. This may cause a user within a VR environment to be unwilling to interact with other users that the user does not already know in the real world, or may result in a user having a bad experience within the VR environment. For example, another user may promise to perform a task or deliver a virtual good in exchange for a payment, but after being paid the other user may not actual perform the task or deliver the virtual good. Similarly, a user may perform a task or deliver a virtual good to another user, but after performing the task or delivering the virtual good may not receive a promised payment from the other user. For another example, a second user that is granting permission to edit a portion of a VR environment created by a first user may delete, vandalize or otherwise ruin a portion of the VR environment created by the first user. For still another example, a user granted access to a virtual event may nefariously utilize a virus or an overtly complex to render virtual element in order to cause software applications to crash or slow to a crawl. In view of the above, it would be beneficial if there were ways in which users of VR environments can determine whether other users should be trusted.

SUMMARY

Various embodiments of the present technology are related to methods and systems for use with a computer implemented virtual reality (VR) environment in which users can explore the VR environment and interact with one another within the VR environment using client computing devices that are being used by the users. Various embodiments of the present technology are also related to one or more processor readable storage devices having instructions encoded thereon which when executed cause one or more processors to perform a method for use with a virtual VR environment in which users can explore the VR environment and interact with one another within the VR environment using client computing devices that are being used by the users.

In accordance with certain embodiments of the present technology, for each user, of a plurality of users of the VR environment, directional information, location information, and gesture information are received from a client computing device used by the user of the VR environment. The directional information is indicative of a direction that a user, or an avatar of the user, is looking within the VR environment. The location information is indicative of a location of an avatar of the user within the VR environment. The gesture information is indicative of one or more gestures that a user, or the avatar of the user, is making. Such an embodiment can also involve determining (based on the directional information and the location information for a user) when the user, or the avatar of the user, is looking at an avatar of another user that is within a specified distance of the avatar of the user within the VR environment. Such an embodiment can also involve determining (based on the gesture information) whether the user who is looking, or whose avatar is looking, at the avatar of the other user (that is within the specified distance of the avatar of the user within the VR environment) has a positive impression of the other user. A reputation associated with the other user is assigned or modified based on whether the user has a positive impression of the other user as determining based on the gesture information. A record of reputation scores associated with at least some of the plurality of users is maintained. Such an embodiment can also involve enabling one of the users of the VR environment to access, using the client computing device they are using, a reputation score associated with another one of the users of the VR environment. Such an embodiment can further include enabling one of the users of the VR environment to control an interaction with another one of the users of the VR environment based on the reputation score associated with the other one of the users of the VR environment.

In accordance with certain embodiments, determining whether a user has a positive impression of another user involves determining whether the user or the user's avatar made a positive gesture at the avatar of the other user within the VR environment. In such an embodiment, there can be a determination that the user has a positive impression of the other user, in response to determining that the user and/or the user's avatar made a positive gesture at the avatar of the other user within the VR environment. For an example, where the positive gesture comprises nodding, there can be a determination of whether the user or the user's avatar is nodding at the avatar of the other user within the VR environment. There can be a determination that the user has a positive impression of the other user, in response to determining that the user or the user's avatar is nodding at the avatar of the other user within the VR environment. Besides nodding, other exemplary types of positive gesture include, but are not limited to, thumbs up, hand shaking, clapping, and waving.

In accordance with certain embodiments, there is also a determination of how many times the user or the user's avatar made the positive gesture at (e.g., nodded at) the avatar of the other user within the VR environment. In such an embodiment, assigning the reputation score to or modifying the reputation score of the other user can be based on how many times the user or the user's avatar made the positive gesture at the avatar of the other user within the VR environment.

Where the client computing device used by a user of the VR environment comprises a head mounted display (HMD), one or more sensors of the HMD can produce the gesture information indicative of one or more gestures that the user of the client computing device or the user's avatar made. Additionally, or alternatively, the client computing device used by a user of the VR environment can include a camera that performs image or video based tracking of the user, and the camera can produce the gesture information indicative of one or more gestures that the user of the client computing device or the user's avatar made. Other types of client computing devices (or devices in communication therewith) that can be used to produce gesture information include, but are not limited to, VR gloves, VR wands or other motion controllers, gaming controllers, and the like.

In accordance with certain embodiments, the reputation score associated with another one of the users is automatically displayed, to one of the users who is, or whose avatar is, looking at an avatar of the other one of the users. Additionally, or alternatively, the reputation score associated with another user, can be displayed to one of the users (via a client computing device of the one of the users who is, or whose avatar is, looking at the avatar of the other user within the VR environment) in response to detecting a specified user input via a user interface of the client computing device.

In accordance with certain embodiments of the present technology, each user of the VR environment is linked to another user in the VR environment via one, two, or more degrees of separation, or not at all. In accordance with certain embodiments, for each user, of a plurality of users of the VR environment, information indicative of the user's impressions of one or more other users of the VR environment is obtained using the client computing device being used by the user. Additionally, such an embodiment can include determining, based on the obtained information, individual-to-individual (I2I) reputations scores associated with the one or more other users of the VR environment, wherein each I2I reputation score is indicative of the user's impression of another one of the users of the VR environment. A record of the I2I reputation scores can be maintained, wherein each I2I reputation score is indicative of a user's impression of another user of the VR environment. Certain embodiments also involve determining relative reputation scores. For example, for a first user of the VR environment, there can be a determination of a relative reputation score associated with a second user of the VR environment, wherein the relative reputation score is determined based on one or more I2I reputation scores associated with the second user that were determined for other users that are linked to both the first user and the second user. Such an embodiment can also involve enabling the first user of the VR environment to access, using the client computing device being used by the first user, the relative reputation score associated with the second user of the VR environment. The relative reputation score associated with the second user of the VR environment, which is determined for the first user, can also based on an I2I score that is indicative of the first user's impression of the second user.

In accordance with certain embodiments, when determining for a first user, the relative reputation score associated with a second user, this can involve weighting the one or more I2I reputation scores associated with the second user that were determined for other users, that are linked to both the first user and the second user, based on how many degrees of separation there are between the other user(s) and the first user. Such an embodiment can also involve gradually decaying over time an I2I reputation score indicative of a user's impression of another user of the VR environment, in response to determining that the user has not interacted with the other user within the VR environment for at least a specified threshold period of time.

In accordance with certain embodiments, the obtained information, which is indicative of a user's impression of another user of the VR environment, comprises gesture information indicative of whether the user who is looking, or whose avatar is looking, at the avatar of the other user within the VR environment has a positive impression of the other user. Such gesture information (indicative of whether the user who is looking, or whose avatar is looking, at the avatar of the other user within the VR environment has a positive impression of the other user) can comprise information indicative of whether the user or their avatar made a positive gesture, examples of which include nodding, thumbs up, hand shaking, clapping, and waving, but are not limited thereto.

In accordance with certain embodiments, a relative reputation score associated with a second user of the VR environment is automatically displayed to a first user of the VR environment, in response to determining that the first user, or their avatar, is looking at an avatar of the second user. Additionally, or alternatively, the relative reputation score associated with second user of the VR environment, can be displayed to the first user of the VR environment, in response to detecting a specified user input via a user interface of the client computing device being used by the first user, while the first user, or their avatar, is looking at an avatar of the second user.

Certain embodiments of the present technology can be used reduce the probability that a user can nefariously rig a system to positively influence (e.g., increase) and/or negatively influence (e.g., decrease) another user's reputation score. Such embodiments can involve receiving from a client computing device used by a first user of the VR environment, information indicative of a positive interaction between an avatar of a first user and an avatar of a second user of the VR environment, which positive interaction can be used to determine that the first user has a positive impression of the second user. Such an embodiment can also involve receiving, from a client computing device used by a third user of the VR environment, further information that can be used to either corroborate or contradict that the positive interaction between the avatar of the first user and the avatar of the second user actually occurred within the VR environment. Based on the further information received from the client computing device used by the third user of the VR environment, there is a determination of whether the positive interaction is corroborated or contradicted. If the positive interaction is corroborated, a reputation score associated with the second user of the VR environment is increased. Conversely, if the positive interaction is contradicted, the reputation score associated with the second user of the VR environment is not increased, and additionally, the reputation score associated with the first user may be decreased. Such embodiments can also enable the each of one or more users of the VR environment to access, using the client computing device they are using, the reputation score associated with the second user of the VR environment.

In accordance with certain embodiments, the received information, which is indicative of a positive interaction between the avatar of the first user and the avatar of the second user of the VR environment, is information indicative of a positive gesture that the avatar of the first user made towards the avatar of the second user. In such an embodiment, the further information, which can be used to either corroborate or contradict that the positive interaction between the avatar of the first user and the avatar of the second user actually occurred within the VR environment, includes information indicative of whether the third user, or their avatar, witnessed the avatar of the first user making the positive gesture towards the avatar of the second user. The positive gesture that can be witnessed by the third user or their avatar can be, e.g., nodding, thumbs up, hand shaking, clapping, or waving, but is not limited thereto. The reputation score associated with the second user of the VR environment, that is increased, not increased, or decreased, can be, e.g., an individual-to-individual (I2I) reputation score that is indicative of the first user's impression of the second user. As was summarized above, and is described in more detail below, one or more such I2I reputation scores can be used to determine a relative reputation score. For example, for a further user of the VR environment, whose avatar interacts with the avatar of the second user of the VR environment, there can be a determination of a relative reputation score associated with a second user of the VR environment, wherein the relative reputation score is determined based on one or more I2I reputation scores associated with the second user that were determined for other users that are linked to both the further user and the second user of the VR environment. Such an embodiment can also enable the further user of the VR environment to access (using the client computing device being used by the further user) the relative reputation score associated with the second user of the VR environment.

Negative interactions can also be corroborated or contradicted. More specifically, an embodiment can also involve receiving, from a client computing device used by a first user of the VR environment, information indicative of a negative interaction between an avatar of the first user and an avatar of a second user of the VR environment, which negative interaction can be used to determine that the first user has a negative impression of the second user. Additionally, further information can be received, from a client computing device used by a third user of the VR environment, wherein the further information can be used to either corroborate or contradict that the negative interaction between the avatar of the first user and the avatar of the second user actually occurred within the VR environment. Such an embodiment can also include determining, based on the further information received from the client computing device used by the third user of the VR environment, whether the negative interaction is corroborated or contradicted. In response to determining that the negative interaction is corroborated, a reputation score associated with the second user of the VR environment can be decreased. Conversely, in response to determining that the negative interaction is contradicted, a reputation score associated with the second user of the VR environment is not decreased, and the reputation score associated with the first user may be decreased.

The information which is indicative of the negative interaction between the avatar of the first user and the avatar of the second user of the VR environment, can be information indicative of a negative gesture that the avatar of the first user made towards the avatar of the second user. The further information, which can be used to either corroborate or contradict that the negative interaction between the avatar of the first user and the avatar of the second user actually occurred within the VR environment, can be information indicative of whether the third user, or their avatar, witnessed the avatar of the first user making the negative gesture towards the avatar of the second user. The negative gesture can be, e.g., shaking head side to side, or thumbs down, but is not limited thereto.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

The following description is of various embodiments of the present technology. The description is not to be taken in a limiting sense but is made merely for the purpose of describing the general principles of the technology. The scope of the technology should be ascertained with reference to the claims. In the description of the embodiments of the present technology that follows, like numerals or reference designators will be used to refer to like parts or elements throughout.

For various reasons, as noted above in the Background, it would be beneficial if there were ways in which users of VR environments can determine whether other users should be trusted. As will be described in further detail below, in order to enable users of VR environments to be able to determine whether other users should be trusted, certain embodiments of the present technology assign reputation scores to users and enable the reputation scores to be shared with other users. This enables a user to determine, based on another user's reputation score, whether the user should trust the other user. However, prior to providing additional details of such embodiments (that can be used to assign and share reputation scores), exemplary systems and devices that can be used to implement such embodiments will first be described with reference to FIGS. 1 and 2.

Figure 1:
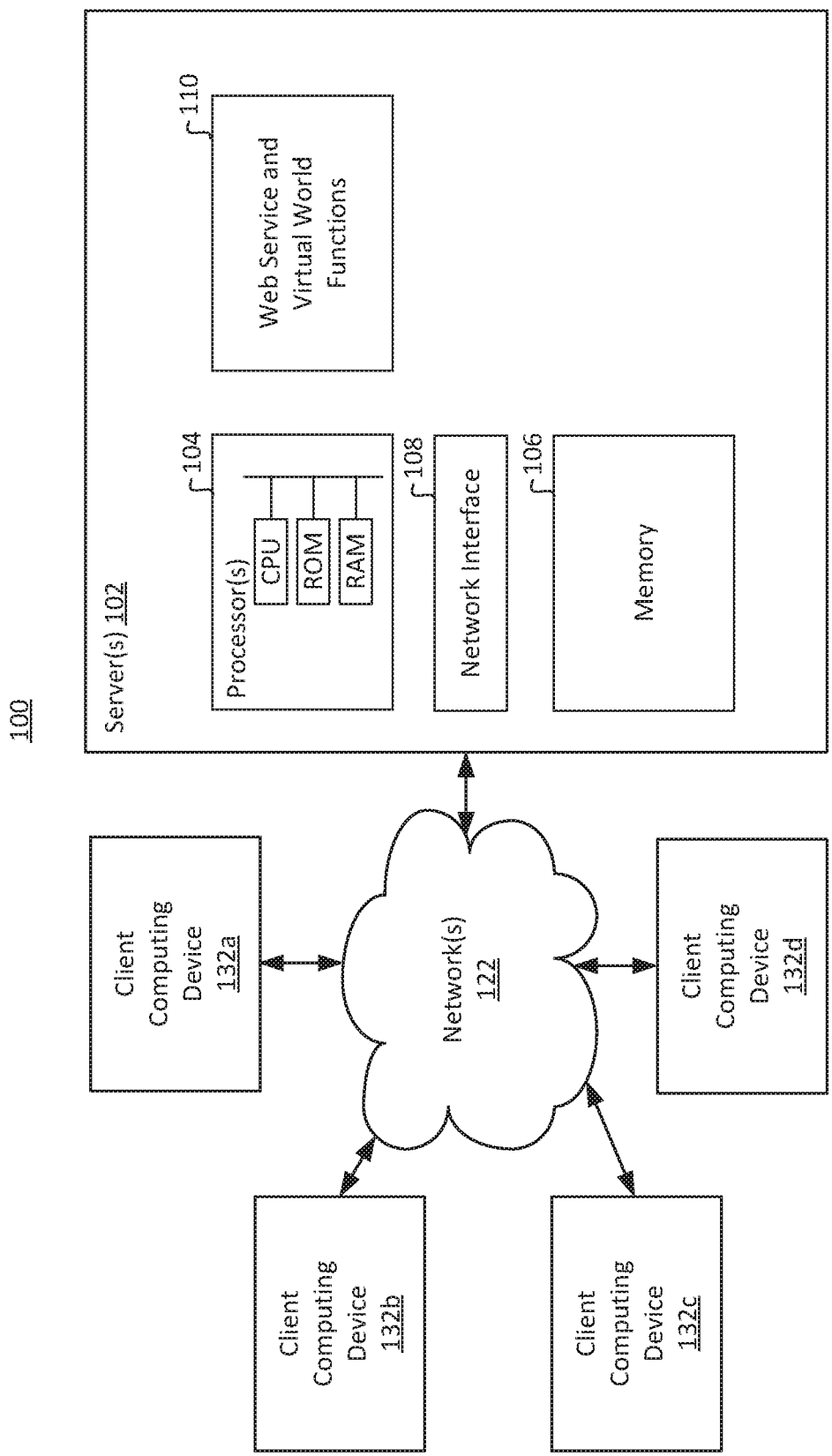
FIG. 1 is a high level block diagram of various components of an exemplary system with which embodiments of the present technology may be used.

FIG. 1 shows a configuration of a system 100 having one or more servers 102 and multiple client computing devices 132a, 132b, 132c, 132d, which are interconnected via one or more networks 122 including, but not limited to, the Internet, a local area network (LAN), a wide area network (WAN), a virtual private network (VPN), or any other network or combination of networks. Such networks, or portions thereof, can be wired, wireless, optical, etc. Embodiments of the present technology are not tied to any particular type of network. Rather, what is important is that the various components, or at least a subset of the various components, can communicate as described herein.

The one or more servers 102 can have a Web server function and a virtual world server function 110, as well as other functions, some of which are discussed below. Each server 102 can include one or more processors 104, memory 106, a network interface 108, as well as many other components. Each processor 104 can include a central processing unit (CPU), read only memory (ROM), and random access memory (RAM), as well as many other components. A server 102 can further have a plurality of server functions that are implemented in the form of application programs stored in the memory 106. The plurality of server functions can include the Web server function and the virtual world server function, represented by block 110, which are implemented using the processor(s) 104.

The memory 106 can include volatile and/or nonvolatile memory such as read only memory (ROM) and random access memory (RAM). The memory 106 can store, e.g., a basic input/output system (BIOS), data and/or program modules that are immediately accessible the processor(s) 104. The memory 106 can also store an operating system, application programs, other program modules, and program data. A server 102 can also include and/or be coupled to other removable/non-removable, volatile/nonvolatile computer storage media, such as, but not limited to, a hard disk drive, nonvolatile magnetic media, a magnetic disk drive, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The client computing devices 132a, 132b, 132c, 132d, etc., can be referred to collectively as the client computing devices 132, or individually as a client computing device 132. Each client computing device 132 (hereinafter often referred to more succinctly as a client device, or simply a client) can comprise a computing device that enables a user of the client device 132 to communicate with the server(s) 102 and/or one or more other client device(s) 132 so that the user can explore a VR environment that is supported by the server(s) 102 and/or client devices 132 and interact with avatars of other users within the VR environment.

Figure 2:
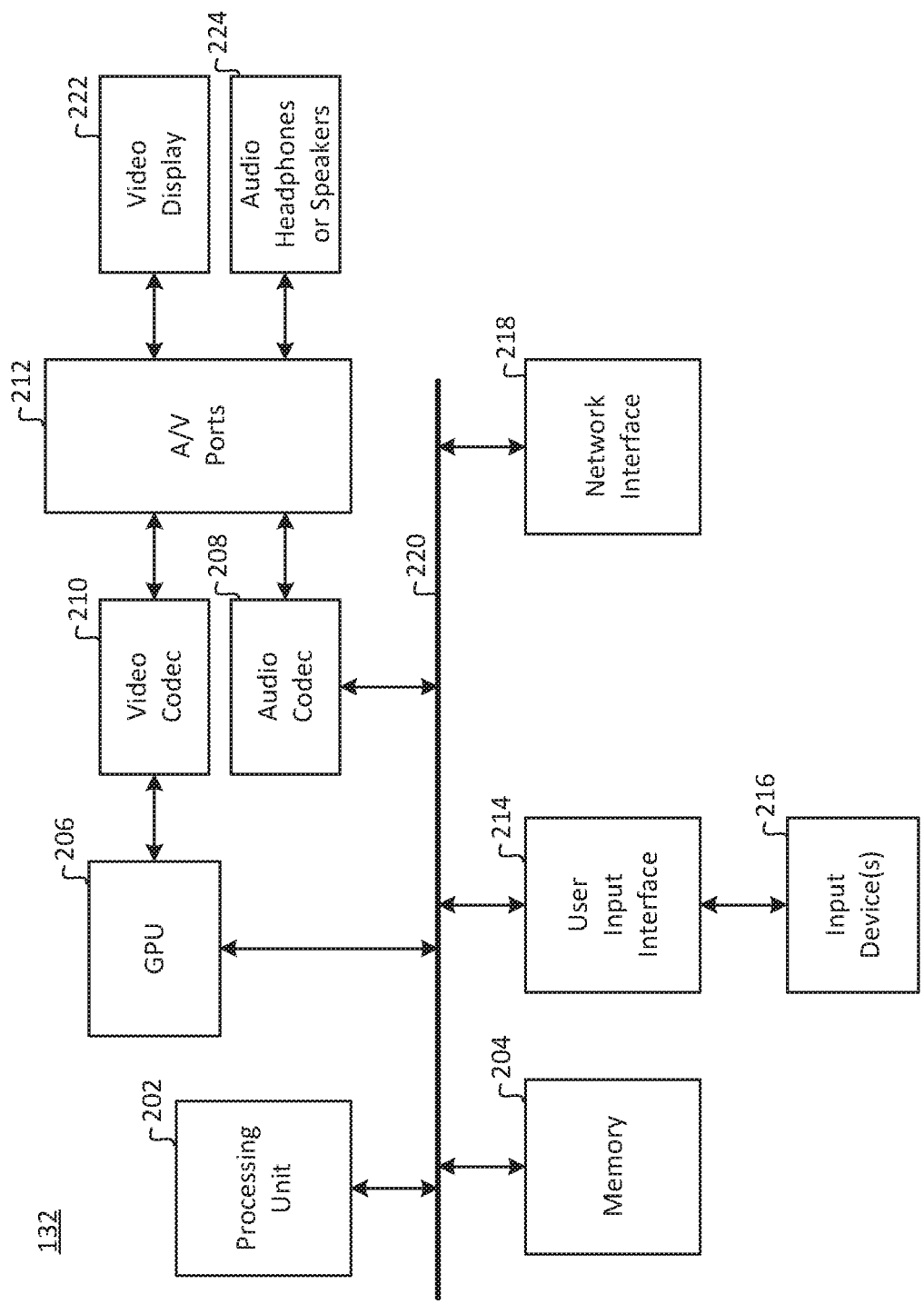
FIG. 2 schematically illustrates exemplary details of a computing device that can operate as an interactive client computing device in the system of FIG. 1.

One or more client devices 132 can be implemented as, or be connected to, a head mounted display (HMD) device that can be used to detect the orientation of a user's head, track a user's eye gaze, accept audio inputs from a user, display VR environments to a user, output stereo audio to a user, and/or the like. Exemplary HMD devices include the Oculus Rift available from Oculus VR, Inc. (headquartered in Menlo Park, Calif.), the HTC Vive available from HTC Corporation (headquartered in New Taipei City, Taiwan), the Samsung Gear VR available from Samsung (headquartered in Seoul, Korea), just to name a few. A client device 132 can alternatively be a desktop computer, a laptop computer, a tablet computer, a smartphone, a gaming computer, or the like. FIG. 2 schematically illustrates exemplary details of an exemplary client device 132.

Referring to FIG. 2, the client device 132 shown therein includes one or more processing units 202 (which can also be referred to as processors), memory 204, a graphical processing unit (GPU) 206, an audio codec 208, a video codec 210, audio/visual (A/V) ports 212, a user input interface 214, input device(s) 216, a network interface 218 and a bus 220. The client device 132 shown in FIG. 2 is only one example of a suitable client device and is not intended to suggest any limitation as to the scope of use or functionality of the presently disclosed subject matter. Neither should the client device 132 be interpreted as having any dependency or requirement relating to any one or combination of components illustrated in the exemplary client device 132. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/ software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

The client device 132 can includes a variety of computer readable media. Computer readable media can be any available media that can be accessed by the client device 132 and includes both volatile and nonvolatile media, removable and non-removable media. Such computer readable media is generally represented by the memory 204, which can include volatile and/or nonvolatile memory such as read only memory (ROM) and random access memory (RAM). The memory 204 can store, e.g., a basic input/output system (BIOS), data and/or program modules that are immediately accessible the processing unit 202. The memory 204 can also store an operating system, application programs, other program modules, and program data. The client device 132 can also include other removable/non-removable, volatile/ nonvolatile computer storage media, such as, but not limited to, a hard disk drive, nonvolatile magnetic media, a magnetic disk drive, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the client device 132 through input device(s) 216 such as a keyboard and/or a pointing device, such as a mouse, trackball or touch pad. Such command can be used, e.g., to control an avatar in a VR environment. Other exemplary input devices include a microphone, joystick, or game pad. Where the client device 132 comprises or is connected to an HMD, the HMD and/or sensors thereof can be input device(s) 216. These and other input devices can be connected to the processing unit(s) 202 through a user input interface 214 that is coupled to the bus 220, but may be connected by other interface and bus structures, such as a parallel port, game port or a universal serial bus (USB). It is also possible that an input device 216 includes one or more cameras and/or other capture devices that can recognize user motion and/or gestures using time-of-flight (TOF), structured light and/or other technologies. Examples of such input devices, which are commercially available, include the Kinect™ available from Microsoft Corporation (headquartered in Redmond, Wash., USA), the Play Station™ Camera available from Sony Corporation (headquartered in Tokyo, Japan) and the Senz3D™ available from Creative Technology Ltd (headquartered in Singapore). Where the client device 132 is a smartphone, a camera on the smartphone can be used to capture a user's facial expressions and facial gestures, a user's head pose, a user's head gestures (such as nodding one's head up and down, or rotating one's head left and right), and the like. In other words, a smartphone camera can be an input device 216. An input device 216 can also include one or more motion sensors, such as, but not limited to a gyroscope, an accelerometer and/or a magnetometer. An input device 216 can also include optical sensor technology. These are just a few examples of the type of input devices 216 that can be used to accept, capture or obtain inputs from users, which are not intended to be all encompassing.

A monitor or other type of display device 222 can be connected to the video codec 210 via audio/visual (A/V) ports 212 or some other video interface. Headphones, speakers or some other audio output device 224 can be connected to the audio codec 208 via the A/V ports 212 or some other audio interface. In specific embodiments, in order to enable a user to experience spatialized sound, the audio output device 224 provides for stereo sound, and more specifically, at least two-channel (e.g., left and right) audio, and potentially more than two-channel audio. Where the client device 132 comprises or is connected to an HMD, the display device 222 can be part of the HMD, as can the headphones, speakers or some other audio output device 224, as can other components shown in FIG. 2.

Figure 3:
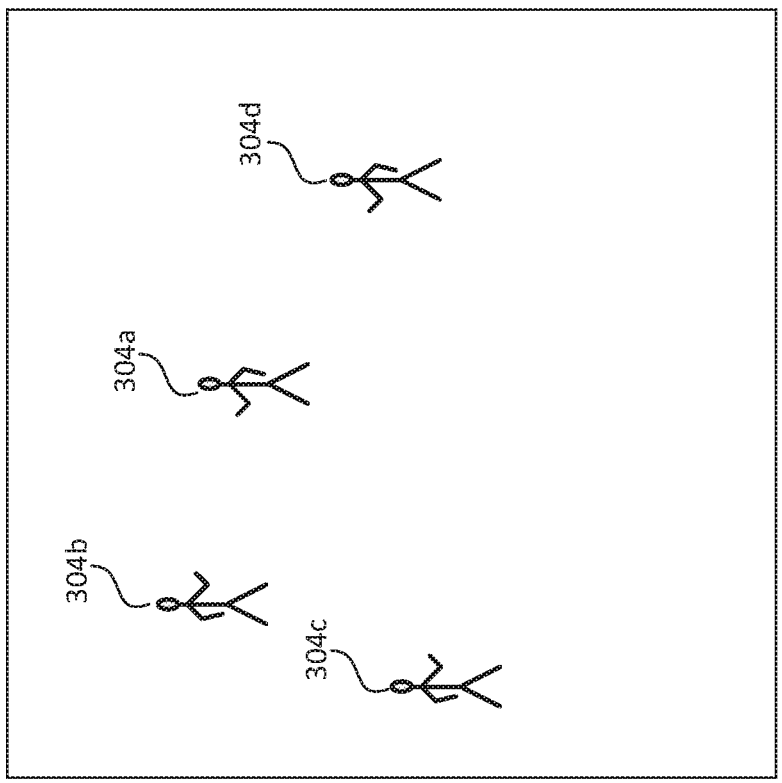
FIG. 3 shows an exemplary portion of a VR environment, which includes multiple avatars, and which is used to describe how a VR environment can be viewed from a third-person perspective.

There are various ways in which a user exploring a VR environment, using a client device 132, can view the VR environment. For example, a user may view the VR environment through the eyes of the use's avatar, i.e., from a first-person perspective, in which case the user may be able to see the body and arms of their avatar but not the head of their avatar (unless looking at a virtual mirror or at some other virtual reflection of their avatar). When in the first-person perspective, a specific user can see the avatar(s) of one or more other users' that are within the field of view (FOV) of the specific user. Alternatively, when a third-person perspective is used a specific user can see their entire avatar as well as other avatars that are located within a same scene in a VR environment, even if the other users are not necessarily within the FOV of the specific user's avatar. For example, FIG. 3 shows an exemplary portion of a VR environment that includes four avatars labeled 304a, 304b, 304c and 304d, which can be referred to collectively as the avatars 304, or individually as an avatar 304. While the avatars 304 in FIG. 3 are illustrated as stick figures for ease of illustration, the avatars 304 within a VR environment would more likely be much more elaborate, detailed and realistic in an actual implementation. Additionally, it is noted that an avatar need not resemble a human, but can essentially resemble anything that a user wants, such as an animal, robot, plant, vehicles, super hero, etc., or more generally anything that a user can imagine. For the sake of this discussion, it is assumed that FIG. 3 shows a third-person perspective for the user that is controlling the avatar 304a. The user that is controlling the avatar 304a can also be referred to as the user corresponding to the avatar 304a, or the user associated with the avatar 304a. Similarly, the avatar 304a can be referred to as the avatar of a user, or an avatar corresponding to or associated with the user.

Figure 4:
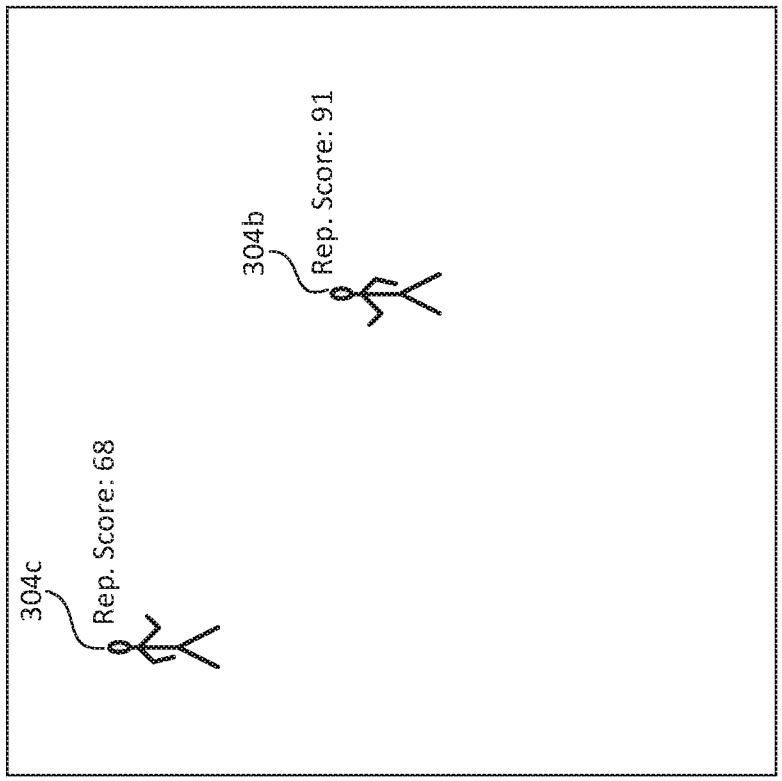
FIG. 4 shows an exemplary portion of a VR environment, which includes multiple avatars, and which is used to describe how a VR environment can be viewed from a first-person perspective.

Since FIG. 3 shows a third-person perspective for the user associated with the avatar 304a, the users associated with the avatar 304a can see the avatars 304b and 304c (which are in front of the avatar 304a and within the FOV of the avatar 304a), their own avatar 304a, as well as the avatar 304d (which is behind the avatar 304a, and thus, not actually within the FOV of the avatar 304a, unless the avatar 304a had turned its head to look behind itself). By contrast, FIG. 4 shows a first-person perspective for the user that is controlling the avatar 304a. In FIG. 4 the user of the avatar 304a can see the avatars 304b and 304c, which are in front of the avatar 304a and within the FOV of the avatar 304a. However, in FIG. 4 the user of the avatar 304a cannot see the avatar 304d, which is behind the avatar 304a, and thus, not actually within the FOV of the avatar 304a. Further, in FIG. 4 the user's own avatar 304a is not shown, although it would be possible that from the first-person perspective that user would be able to see at least a portion of their avatar 304a that is within their FOV, such as their arms and/or legs, but not limited thereto. When a user is exploring a VR environment, the user may be able to use a user interface to switch back and forth between exploring the VR environment using a third-person perspective (e.g., such as in FIG. 3) or a first-person perspective (e.g., such as in FIG. 4). It would also be possible for a user to change how the third-person perspective is shown, e.g., from a side view, or from a top view, and/or the like. In the following description, the user associated with the avatar 304a is often referred to as user A, the user associated with the avatar 304b is often referred to as user B, the user associated with the avatar 304c is often referred to as user C, and the user associated with the avatar 304d is often referred to as user D.

Gesture Based Reputation Scores

Certain embodiments of the present technology, described below, take advantage of the fact that a person that likes or generally agrees with another person with which the person is interacting will often make positive gestures towards the other person. This may occur subconsciously, without the person even realizing they are making the positive gesture. For example, when a person likes or generally agrees with another person with which the person is interacting, the person will typically, and frequently, nod their head at the other person by tilting their head in alternating up and down arcs along the sagittal plane. Another exemplary positive gesture in many cultures (but not all cultures) is the thumbs up gesture. Other exemplary positive gestures include, but are not limited to, hand shaking, clapping, and waving. In accordance with certain embodiments of the present technology, if a user (and/or the user's avatar) makes a positive gesture towards an avatar of another user in a VR environment, this positive gesture is recognized and used to assign or modify a reputation score of the other user. Such embodiments are described below with reference to the high level flow diagram of FIG. 5.

Figure 5:
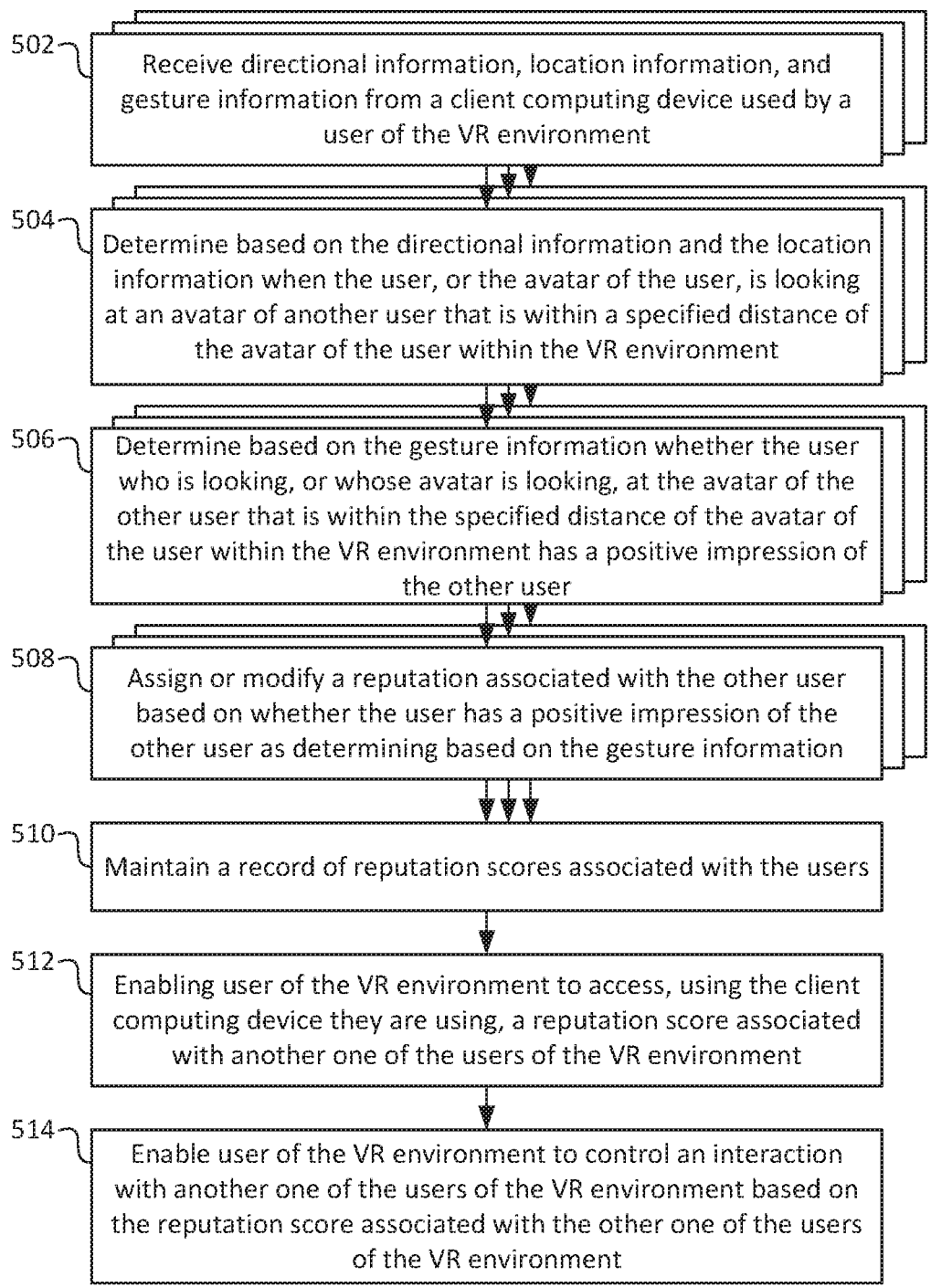
FIG. 5 is a high level flow diagram that is used to describe various methods that can be used to assign reputations scores to users of a computer implemented VR environment, as well as methods that can be used to maintain, access and use such reputation scores, in accordance with certain embodiments of the present technology.

Referring to FIG. 5, steps 502, 504, 506 and 508 are performed for each user, of a plurality of users of a VR environment. Step 502 involves receiving directional information, location information, and gesture information from a client computing device (e.g., 132) used by a user of the VR environment. The directional information is indicative of a direction that the user, or an avatar of the user, is looking within the VR environment. The location information is indicative of a location of an avatar of the user within the VR environment, and thus can be used to determine when two avatars are within a specified distance (within the VR environment) of one another. The gesture information is indicative of one or more gestures that the user, or the avatar of the user, is making. Exemplary gestures were mentioned above. Exemplary types of input devices that can be used to detect gestures of users were also mentioned above.

Step 504 involves determining based on the directional information and the location information when the user, or the avatar of the user, is looking at an avatar of another user that is within a specified distance of the avatar of the user within the VR environment.

Step 506 involves determining based on the gesture information whether the user (who is looking, or whose avatar is looking, at the avatar of the other user that is within the specified distance of the avatar of the user within the VR environment) has a positive impression of the other user. Additional details of step 506, according to certain embodiments of the present technology, are described below with reference to the high level flow diagram of FIG. 6.

Step 508 involves assigning or modifying a reputation associated with the other user based on whether the user has a positive impression of the other user as determining based on the gesture information.

As noted above, steps 502, 504, 506 and 508 are performed for each user, of a plurality of users of a VR environment. For example, referring back to FIG. 3, steps 502, 504, 506 and 508 can be performed for the user associated with the avatar 304a (which user can be referred to as user A), separately for the user associated with the avatar 304b (which user can be referred to as user B), separately for the user associated with the avatar 304c (which user can be referred to as user C), as well as separately for the user associated with the avatar 304d (which user can be referred to as user D). These steps are preferably performed in parallel for the plurality of users, but can alternatively be performed serially. Referring again to FIG. 5, to represent or illustrate that steps 502, 504, 506 and 508 are performed for each of a plurality of users, additional blocks are shown behind each block that represents one of these steps.

Still referring to FIG. 5, step 510 involves maintaining a record of reputation scores associated with at least some (and preferably each) of the plurality of users. Such reputation scores can be maintained in one or more tables and/or databases, but is not limited thereto. As will be described in additional detail below, a single type of reputation score can be maintained for each user, wherein the reputation score can be a global reputation score, an individual-to-individual (I2I) reputation score, or a relative reputation score. It is also possible that multiple types of reputation scores be maintained for each user, or at least some of the users. Additional details of the various types of reputation scores are described below. Step 510 can involve maintaining one or more reputation scores for the user A (associate with the avatar 304a), maintaining one or more reputation scores for the user B (associate with the avatar 304b), maintaining one or more reputation scores for the user C (associate with the avatar 304c), and maintaining one or more reputation scores for the user D (associate with the avatar 304d), etc. An I2I reputation score that is indicative of user A's impression of user B can also be written as I2I(A→B). A relative reputation score associated with user B, that is being determined for a user A, can be written as RR(A→B).

Step 512 involves enabling a user (e.g., user A) of the VR environment to access, using the client computing device (e.g., 132a) they are using, one or more reputation score(s) associated with another one of the users of the VR environment. In accordance with certain embodiments, at step 512, whenever user A (or their avatar 304a) looks at the avatar 304b (of user B), the reputation score of the user (i.e., user B) associated with the avatar 304b can be automatically displayed to the user A. Similarly, whenever user A (or their avatar 304a) looks at the avatar 304c (of user C), the reputation score of the user (i.e., user C) associated with the avatar 304c can be automatically displayed to the user A. More generally, one or more reputation scores associate with each avatar (and more specifically, the user associated therewith) that is displayed to a user (e.g., user A) can be automatically and simultaneously displayed to the user. For example, referring briefly back to FIG. 4, a reputation score (Rep. Score) of 68 is shown as being displayed near the avatar 304c (for user C), and a reputation score of 91 is shown as being display near the avatar 304b. The reputation score(s) that is/are automatically displayed can always be displayed, or can just be displayed for a specified amount of time starting at the point at which a user (and/or their avatar)

initially sees the avatar(s) of one or more other users. In certain embodiments, one or more reputation score(s) of another use can be automatically displayed to a user when the user is about to perform an interaction (e.g., entering into a financial transaction or some other agreement with the other user) for which it is likely that the user would want to know the reputation score(s) of the other user before confirming they want to proceed with performing the interaction. In certain embodiments, reputation score(s) can be displayed to a user in response to a specified user input (via a user interface of the client computing device being used by user). Such a user input can be a certain button or combination of buttons being pressed, or a specific gesture being made, or a specific selection from a pulldown menu, just to name a few. Where reputations score(s) is/are automatically displayed to a user for only a brief period of time, the user can thereafter cause the reputation score(s) to be redisplayed by selecting a specified user input.

Reputations scores can be numeric value within some specified range. For example, the range of numeric value reputation scores can be from 0 to 1, from 0 to 4, from 1 to 4, from 0 to 10, from 1 to 10, from 0 to 100, or from 1 to 100, but are not limited thereto. Reputation scores need not be numeric values, but can instead be indicated by a quantity of symbols, such as stars, smiley faces, or the like. For example, a reputation score can be within the range of zero to four stars. Reputation scores can alternatively be color based, e.g., with green representing a high or good reputation, yellow representing a medium reputation, and red representing a low or bad reputation. Other variations are also possible and within the scope of the embodiments described herein. For another example, certain types of reputation scores (e.g., I2I reputation scores) can be binary types scores, such as: 0 or 1; "trust" or "don't trust"; or "like" or "don't like", but are not limited thereto.

Still referring to FIG. 5, step 514 involves enabling a user of the VR environment to control an interaction with another one of the users of the VR environment based on the reputation score associated with the other one of the users of the VR environment. For example, assume that user A (associated with the avatar 304a) is considering entering into a financial transaction or some other agreement with user B (associated with the avatar 304b). User A can decide, based on a reputation score for user B (that is displayed to user A), whether user A wants to enter into the financial transaction or other agreement with user B. Such a decision can be indicated by user A using a user interface of or associated with the client device (e.g., 132a) being used by user A. For example, if user A observes that user B has a high reputation score, then user A may agree to enter into a transaction or other agreement with user B. Conversely, if user A observes that user B has a low reputation score, then user A may decide not to enter into a transaction or other agreement with user B. In certain embodiments, user A may have a profile or policy, specified by user A, which indicates that user A will only enter into financial transactions or other agreements with other users that have at least some specified minimum reputation score. In this latter embodiment, the financial transaction or other agreement that user A tries to enter into with another user (e.g., user B) would be allowed if the other user (user B) had at least the minimum reputation score specified by user A. However, if the other user (user B) did not have at least the minimum reputation score specified by user A, the financial transaction or other agreement with the other user (user B) would be automatically blocked from occurring. Rather than automatically blocking the transaction or agreement, a warning can be displayed to user A, which user A can override if they wish. Other variations are also possible and within the scope of the embodiments described herein.

There are other types of interactions with another user that a user can control based on the reputation score associated with the other user, including, but not limited to: allowing the other user to enter a secure area (e.g., a virtual home or virtual store) or event (e.g., a virtual meeting, virtual party, or virtual conference); and granting the other user permission to edit a portion of a VR environment; just to name a few.

Figure 6:
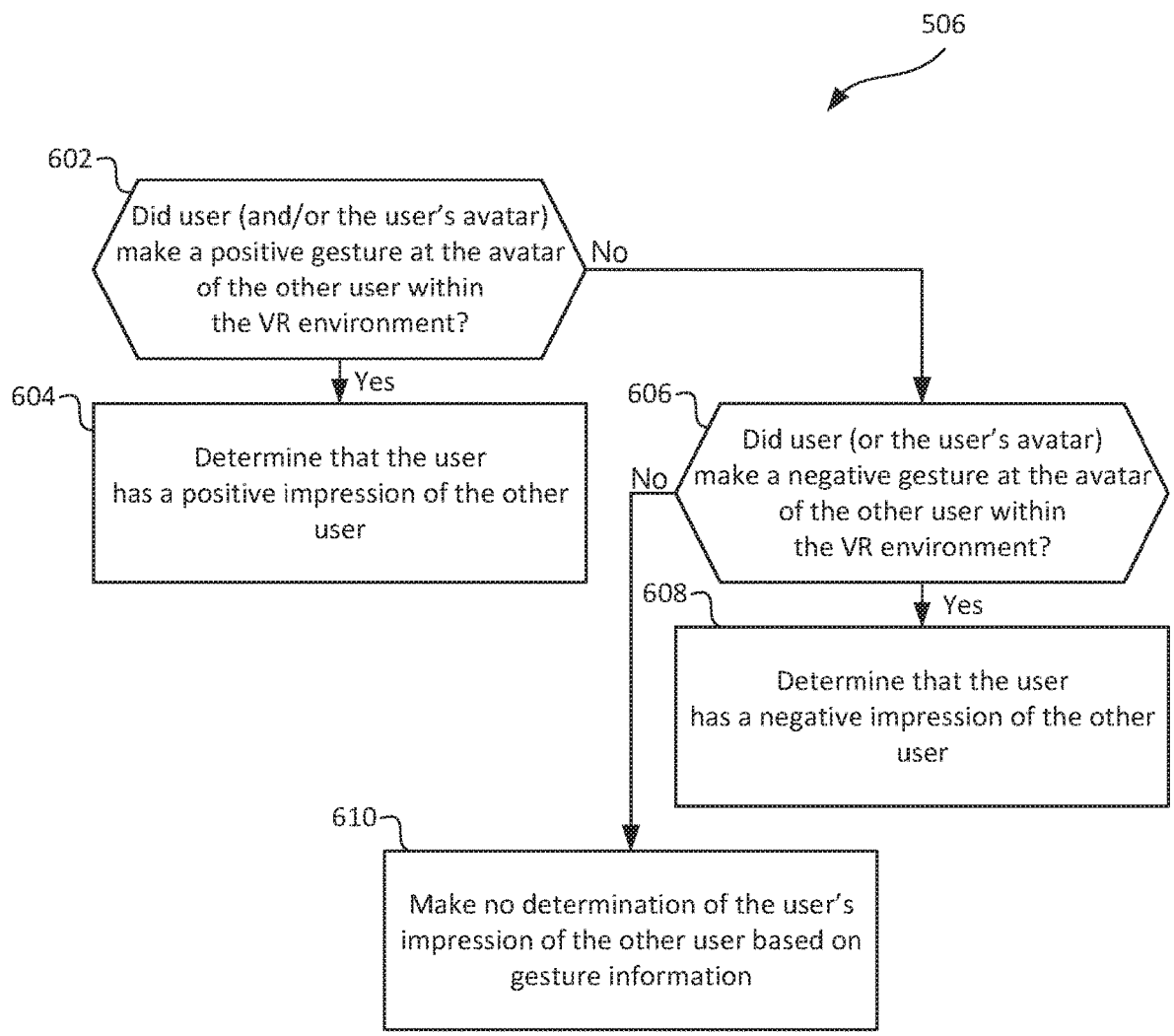
FIG. 6 is a flow diagram that is used to describe additional details of one of the steps introduced in FIG. 5, according to certain embodiments of the present technology.

The flow diagram in FIG. 6 will now be used to provide additional details of step 506, which was introduced above with reference to FIG. 5. As explained above, step 506 involves determining based on the gesture information whether a user (who is looking, or whose avatar is looking, at the avatar of another user that is within the specified distance of the avatar of the user within the VR environment) has a positive impression of the other user. Referring to FIG. 6, step 602 involves determining whether the user or the user's avatar made a positive gesture at the avatar of the other user within the VR environment. For example, step 602 can involve determining whether user A (associated with the avatar 304a) or their avatar made a positive gesture at the avatar 304b (associate with user B). As noted above, an exemplary positive gesture that a user (or their avatar) can make towards the avatar of another user is nodding their head, giving a thumbs up, clapping, etc. If the answer to the determination at step 602 is Yes, then flow goes to step 604 and there is a determination that the user has a positive impression of the other user. If the answer to step 604 is No, then flow goes to step 606 and there is a determination of whether the user or the user's avatar made a negative gesture at the avatar of the other user within the VR environment. Exemplary negative gestures that one user (or their avatar) can make towards the avatar of another user include, but are not limited to, rotating one's head left and right (i.e., shaking one's head "no"), giving a thumbs down, etc. If the answer to the determination at step 606 is Yes, then flow goes to step 608 and there is a determination that the user has a negative impression of the other user. If the answer to the determination at step 606 is No, then flow goes to step 610, which indicates that the user's impression of the other user cannot be determined based on gesture information. In an alternative embodiment, steps 606 and 608 are removed from the flow diagram, and if the answer to step 602 is No then flow goes directly to step 610. It is note that the phrases making a "gesture at" and making a "gesture towards" are used interchangeably herein. In other words, the terms "at" and "towards" are used interchangeably herein when referring to gestures made.

In addition to determining whether a user (or the user's avatar) made a positive gesture at the avatar of another user, there can also be a determination of how many times the user or the user's avatar made the positive gesture (e.g., nodding their head) at the avatar of the other user within the VR environment. For example, there can be a determination of how many time the user of the avatar 304a (or the avatar 304a) nodded their (or its) head while looking at the avatar 304b, while the avatars 304a and 304b were within a specified distance of one another within the VR environment. In certain embodiments, step 508 can involve assigning a reputation score to, or modifying the reputation score of, the other user based on how many times the user or the user's avatar made the positive gesture at the avatar of the other user within the VR environment. For the example, the more times that one user (and/or their avatar) nodded at the avatar of another user, the more the reputation score of the other user can be increased. For another example, the more times that one user (and/or their avatar) clapped at the avatar of another user or gave the thumbs up to the avatar of the other user, the more the reputation score of the other user can be increased. In certain embodiments where a user's reputation score can be decreased in response to negative gestures being directed towards the user's avatar, how many times the negative gesture occurred can be tracked and used to determine how much a reputation score should be reduced.

Where the client computing device 132 of a user is (or is in communication with) a head mounted display (HMD), one or more sensors of the HMD can be used to produce the gesture information indicative of one or more gestures that the user of the client computing device or the user's avatar made at or toward the avatar of another user. Where the client device of a user is (or is in communication with) one or more cameras that performs image or video based tracking of the user, the camera may produce the gesture information indicative of one or more gestures that the user of the client computing device or the user's avatar made. Such cameras can include, but are not limited to, a depth camera, an RGB camera, an IR camera. Other types of client devices (or devices in communication therewith) that can be used to produce gesture information include, but are not limited to, VR gloves, VR wands or other motion controllers, gaming controllers, and the like.

In accordance with certain embodiments, the various types of reputation scores described herein (e.g., global reputation scores, I2I reputation scores, and/or relative reputation scores) can be published to or stored in a blockchain. Additionally, or alternatively, other types of information, such as, but not limited to, directional information (indicative of a direction that the user, or an avatar of the user, is looking within the VR environment), location information (indicative of a location of an avatar of the user within the VR environment), and/or gesture information (indicative of one or more gestures that a user, or the avatar of the user, is making) can be published to or stored in a blockchain. A blockchain is a continuously growing list of records, called blocks, which are linked and secured using cryptography. Each block typically contains a cryptographic hash of the previous block, a timestamp and transaction data. By design, a blockchain is inherently resistant to modification of the data. It is "an open, distributed ledger that can record transactions between two parties efficiently and in a verifiable and permanent way." For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. Blockchains are secure by design and are an example of a distributed computing system with high Byzantine fault tolerance. Decentralized consensus has therefore been achieved with a blockchain. By publishing or storing reputation scores and other types of information described herein in a blockchain, users and/or hackers can be prevented from hacking into a system in order to try to nefariously alter such information for their benefit and/or the detriment of others.

Relative Reputation Scores

As noted above, various different types of reputation scores can be determined and maintained for users of a VR environment, such as, but not limited to, global reputation scores, individual-to-individual (I2I) reputation scores, and/or relative reputation scores. As also noted above, one or more such reputation scores of a user can be made available to other users, e.g., by being displayed to the other users automatically and/or in response to a specific user input via a user interface of a client computing device.

A global reputation score associated with a user is an overall reputation score for that user, which score does not take into account which specific other user is viewing or otherwise accessing the reputation score. In other words, a global reputation score is an overall rating for a specific user that does not take into account another individual user's impression of the specific user, and does not take into account impressions (of the specific user) associated with further individuals linked to the other user.

As a rough analogy in the real world, a global reputation score is roughly analogous to a crowdsourced product or business review on YELP™ or AMAZON™, which types of reviews are vulnerable to manipulations by nefarious users. However, a clear distinction is that a global reputation relates to the reputation of a user, not a product or business, and a global reputation score relates to a user's reputation within a VR environment, not within the real world. Indeed, it is possible that a person/user behaves much differently when interacting with others in a VR environment than that person does when interacting with others in the real world. In other words, a person/user may have a totally different personality and behavior in a VR environment than they do in the real world. This can be due to the anonymity that a user may experience within a VR environment, or due to potential civil and criminal penalties (that exist in the real world) not being a deterring factor in a VR environment, as well as other possible reasons.

An individual-to-individual (I2I) reputation score can be thought of as the reputation of an individual user from the perspective of another individual user. In other words, an I2I reputation score may be indicative of one user's impression of another one of the users of the VR environment. In certain embodiments, the global score associated with a specific user is an average of all the I2I reputation scores that other users determined for the specific user, wherein the average may or may not be a weighted average, depending upon implementation. For example, assume that three I2I reputation scores exist for user D, which three I2I reputation scores are based on user A's impression of user D, user B's impression of user D, and user C's impression of user D. Continuation with this example, a global reputation score can be the average of the aforementioned three I2I reputation scores.

A relative reputation score associated with a second user (e.g., user B), that is being determined for a first user (e.g., user A), can take into account the first user's impression of the second user (e.g., user A's impression of user B), as well as impressions of the second user (e.g., B) that one or more other users (e.g., users C and/or D) linked to the first user have of the second user. In other words, when a relative reputation score associated with a second user is being determined for a first user, the relative reputation score associated with the second user can be based on I2I reputation scores associated with the second user that were determined for one or more other users that are linked to both the first user and the second user. The relative reputation score associated with the second user can also be based on an I2I reputation score that is indicative of the first user's impression of the second user, if there is one degree of separation between the first and second users, and thus, if there already exists an I2I reputation score indicative of the first user's impression of the second user. As noted above, relative reputation score associated with user B, that is being determined for a user A, can be written as RR(A→B).

Figure 7:
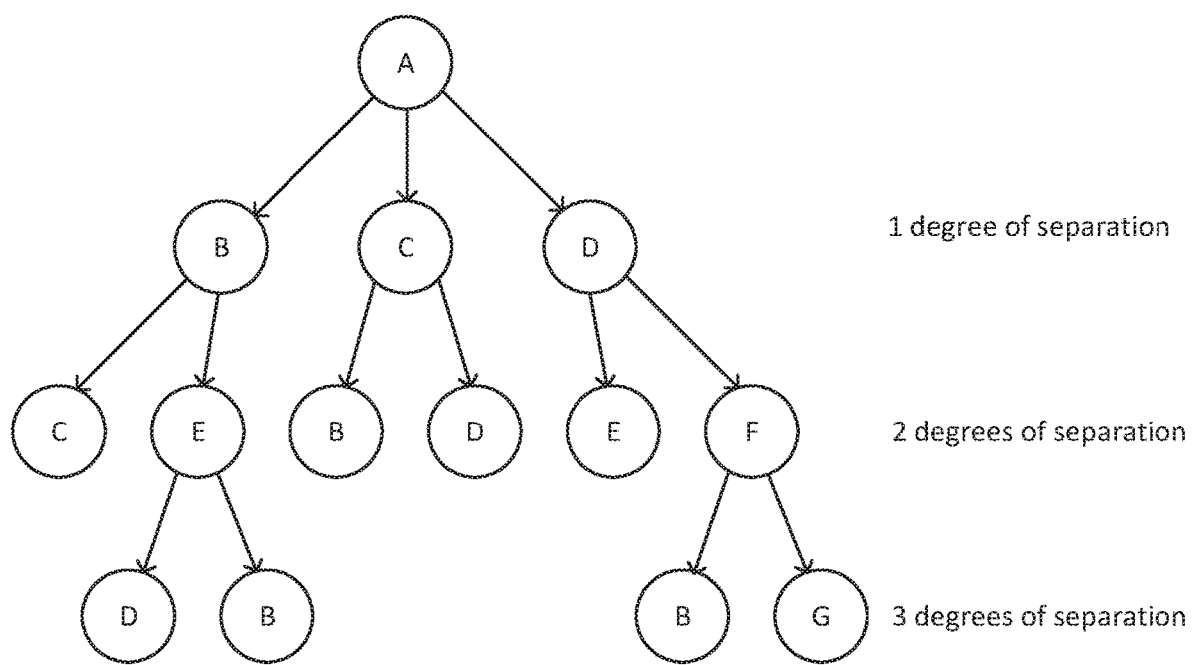
FIG. 7 is a diagram that is used to generally explain various different types of reputations scores that can be determined for a user.

Reference is now made to the diagram of FIG. 7, which can be referred to as a linking diagram, since it shows how various users of a VR environment can be linked to one another with one degree of separation, two degrees of separation, three degrees of separation, etc. In FIG. 7 each circle with a letter in the circle is representative of a user of a VR environment, and arrows are drawn between users that are only one degree of separation apart from one another. For the purpose of this discussion, a specific user (e.g., user A) is one degree of separation from another user (e.g., user B), where the specific user (e.g., user A) has sufficiently interacted with or otherwise knows the other user (e.g., user B) such that the specific user (e.g., user A) has developed an impression of the other user (e.g., user B). In other words, when there exists an I2I reputation score indicative of a first user's impression of a second user, there is one degree of separation between the first user and the second user.

In FIG. 7, in the top or first row is a circle representing user A; in the second row are circles representing users B, C, and D; in the third row are circle representing users C, E, B, D, E, and F; and in the fourth row are circles representing users D, B, B, and G.

Still referring to FIG. 7, looking at the first and second rows, user A is shown as being one degree of separation from each of users B, C and D. As noted above, for the purpose of this discussion, a specific user (e.g., user A) is one degree of separation from another user (e.g., user B), where the specific user (e.g., user A) has sufficiently interacted with or otherwise knows the other user (e.g., user B) such that the specific user (e.g., user A) has developed an impression of the other user (e.g., user B). As can be seen from the first and third rows in FIG. 7, users E and F are each shown as being two degrees of separation from user A. As can be seen from the first and fourth rows in FIG. 7, user G is shown as being three degrees of separation from user A. Looking at the second and third rows in FIG. 7, user B is shown as being one degree of separation from each of users C and E; user C is shown as being one degree of separation from each of users B and D; and user D is shown as being one degree of separation from each of users E and F. Looking at the third and fourth rows in FIG. 7, user E is shown as being one degree of separation from each of users D and B; and user F is shown as being one degree of separation from each of users B and G. This is an overly simplified linking diagram, as there would most likely be significantly more than seven users of a VR environment, and each such user would likely have developed impressions of more than two or three other users.

For the purpose of this discussion, whenever a specific user (e.g., user A) is one degree of separation from another user (e.g., user B), the specific user will have an I2I reputation score for the other user, which is also referred to as an I2I score associated with the other user. Accordingly, as can be appreciated from FIG. 7, user A has an I2I reputation score for user B (which can also referred to as user A having an I2I score associated with user B), user A has an I2I reputation score for user C (which can also referred to as user A having an I2I score associated with user C), and user A has an I2I reputation score for user D (which can also referred to as user A having an I2I score associated with user D). As can also be appreciated from FIG. 7, user B has an I2I reputation score for user C, and user B has an I2I reputation score for user E. For another example, as can be appreciated from FIG. 7, user F has an I2I reputation score for user B, and user F has an I2I reputation score for user G.

A user (e.g., user A) can specify their I2I reputation score for another user (e.g., user B) using a keyboard, pulldown menu, or some other user interface. Alternatively, an I2I reputation score that a first user (e.g., user A) has for a second user (e.g., user B) can be determined based on one or more gestures made by the first user (and/or the first user's avatar) towards an avatar the second user, as well as based on how many time such gestures were made. Examples of such gestures and how they can be tracked were discussed above. In an embodiment, a first user (e.g., user A) can specify an initial I2I reputation score for another user (e.g., user B) using a keyboard, pulldown menu, or some other user interface, and the initial I2I reputation score can be modified (e.g., increased or decreased) based on types and frequencies of gestures that the first user (and/or the first user's avatar) makes towards the avatar of the second user. In another embodiment, a first user (e.g., user A) can specify an initial I2I reputation score for another user (e.g., user B) based on types and frequencies of gestures that the first user (and/or the first user's avatar) makes towards the avatar of the second user, and the initial I2I reputation score can be modified (e.g., increased or decreased) using a keyboard, pulldown menu, or some other user interface. Other variations are also possible and within embodiments of the present technology. In accordance with certain embodiments, a user (e.g., user A) can only specify and/or modify an I2I reputation score for another user (e.g., user B) when the avatar associated with user A (e.g., the avatar 304a) is within a specified proximity of the avatar of user B (e.g., the avatar 304b) with the VR environment, and when the user A or their avatar is looking at the avatar of user B, or more generally when the avatar of user A is interacting with the avatar of user B. This enables such specifying and/or modifying of an I2I reputation score to be corroborated or contradicted by other users that witnessed the interaction (or lack thereof), as will be described in additional detail below. In certain embodiments, when two users interact with one another through their avatars and one of the users uses a keyboard, pulldown menu, or some other user interface to rate another user (instead of a gesture), that rating can be shown in a messaging channel or thread that is shown to one or more other users having avatars that are in the vicinity of the two interacting avatars. This can also enable such specifying and/or modifying of an I2I reputation score to be corroborated or contradicted by other users that witness the interaction, as will be described in additional detail below.

As noted above, a relative reputation score for a specific user (e.g., user B) may take into account another user's impression of the specific user (e.g., user A's impression of user B), as well as impressions of the specific user (e.g., user B) associated with further individuals (e.g., users C and D) linked to the other user (e.g., user A). The high level flow diagram of FIG. 8 will now be used to summarize methods, according to specific embodiments of the present technology, which can be used to determine, maintain, access and utilize relative reputation scores within a VR environment.

Figure 8:
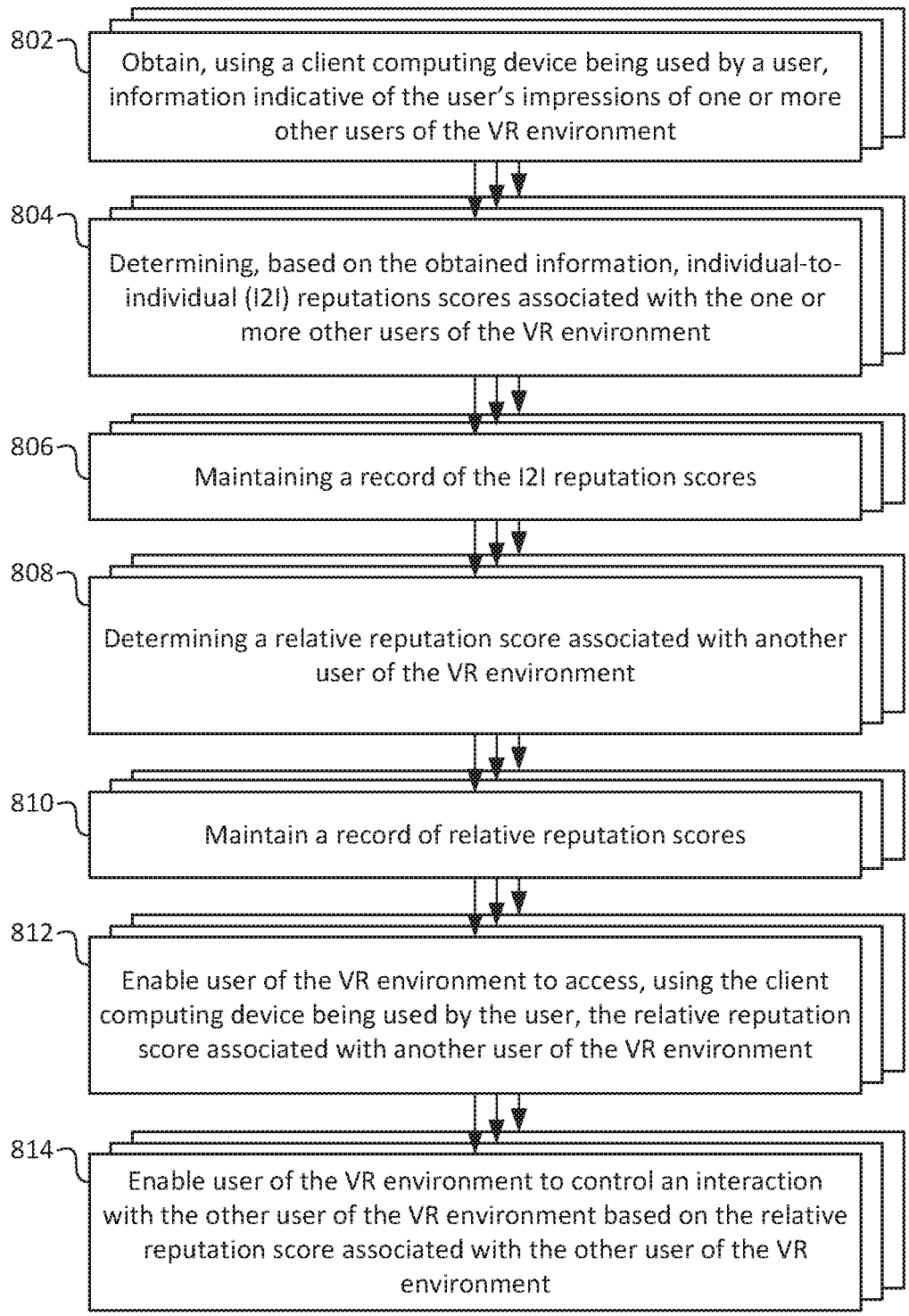
FIG. 8 is a high level flow diagram that is used to describe various methods that can be used to determine relative reputations scores for users of a computer implemented VR environment, as well as methods can be used to maintain, access and use such relative reputation scores, in accordance with certain embodiments of the present technology.

Referring to FIG. 8, steps 802, 804, 806, 808, 810, 812, and 814 are performed for each user, of a plurality of users of a VR environment. Step 802 involves obtaining, using a client computing device (e.g., 132) being used by a user, information indicative of the user's impressions of one or more other users of the VR environment. As noted above, such information (indicative of one user's impressions of one or more other users) can be entered by the user using a keyboard, pulldown menu, or some other user interface, and/or can be based on gestures that the user (and/or the user's avatar) made towards one or more other users' avatars. Exemplary gestures and how they can be interpreted were described above. Referring briefly back to FIG. 7, one or more instances of step 802 can involve obtaining information indicative of user A's impression of user B, user A's impression of user C, and user A's impression of user D. One or more further instances of step 802 can involve obtaining information indicative of user B's impression of user C, and user B's impression of user E. One or more additional instances of step 802 can involve obtaining information indicative of user C's impression of user B, and user C's impression of user D. One or more further instances of step 802 can involve obtaining information indicative of user D's impression of user E, and user D's impression of user F. And so on . . . .

Referring again to FIG. 8, step 804 involves determining, for one of the user's of the VR environment, I2I reputations scores associated with the one or more other users of the VR environment, based on the obtained information (obtained at step 802). Each such I2I reputation score is indicative of one of the user's (e.g., user A's) impression of another one of the users (e.g., user B) of the VR environment. For example, referring briefly back to FIG. 7, one or more instance of step 804 can involve determining for user A an I2I reputation score associated with user B, determining for user A an I2I reputation score associated with user C, and determining for user A an I2I reputation score associated with user D. One or more additional instances of step 804 can involve determining for user B an I2I reputation score associated with user C, and determining for user B an I2I reputation score associated with user E. One or more further instance of step 804 can involve determining for user C an I2I reputation score associated with user B, and determining for user C an I2I reputation score associated with user D. One or more additional instances of step 804 can involve determining for user D an I2I reputation score associated with user E, and determining for user D an I2I reputation score associated with user F. And so on . . . .

Referring again to FIG. 8, step 806 involves maintaining a record of the I2I reputation scores, wherein each such I2I reputation score is indicative of a user's impression of another user of the VR environment. Exemplary I2I scores that can be maintained at step 806 include the I2I scores that were determined at instances of step 804, as discussed above. Such I2I scores can be stored in one more tables and/or databases, but are not limited thereto.

Step 808 involves, for a particular user of the VR environment (e.g., a first user, such as user A), determining a relative reputation score associated with another user (e.g., a second user, such as user B) of the VR environment. In accordance with certain embodiments, a relative reputation score determined at an instance of step 808 is based on one or more I2I reputation scores associated with the second user (e.g., user B) that were determined for other users that are linked to both the first user (e.g., user A) and the second user (e.g., user B).

In certain embodiments, a first user (e.g., user A) can be considered linked to a second user (e.g., user B) where there is no greater than one degree of separation between the first user and the second user. Where there is only one degree of separation between a first user (e.g., user A) and a second user (e.g., user B), the first user can be said to be "directly linked" to the second user. Where a first user is directly linked to a second user, the first user will have an I2I score for the second user. In certain embodiments, a first user (e.g., user A) can be considered linked to another user (e.g., user E) where there is no greater than two degrees of separation between the first user and the second user. Where there are two (or potentially more) degrees of separation between a first user (e.g., user A) and another user (e.g., user E), the first user can be said to be indirectly linked to the other user. More generally, a user can be said to be linked to another user where there are no more than N degrees of separation between the user and the other user, where N is a predetermined integer value that is greater than or equal to one, wherein N can be specified by an entity that is at least partially responsible for hosting or otherwise supporting a VR environment. Preferably N should be less than six, because it is likely that all (or almost all) of the users of a VR environment would be linked to another within six degrees of separation. Some potential good values to use for N would be one, two, or three, but other values can be used if desired. Assume for example that a system is configured such that users within two degrees of separation are considered linked to one another. In such a system, users within one degree of separation from one another are directly linked to one another, and users that are two degrees of separation from one another are indirectly linked to one another.

Referring briefly back to FIG. 7, assume that at an instance of step 808 a relative reputation score associated with user B is being determined for user A. In other words, assume that for user A, a relative reputation score associated with user B is being determined based on one or more I2I reputation scores associated with user B that were determined for other users (e.g., users C, D and F) that are linked to both user A and user B. For this example, it is assumed that users are linked to one another so long as they are within two degrees of separation from one another, i.e., are either one or two degrees of separation from one another.

As shown in FIG. 7, users B, C and D are each one degree of separation from user A. As also shown in FIG. 7, users E and F are each two degrees of separation from user A. Since user G in FIG. 7 is three degrees of separation from user A, for this particular example user G is not considered to be linked to user A. Still referring to FIG. 7, users C, E and F are each one degree of separation from user B, and user D is two degrees of separation from user B. Additionally, user G is four degrees of separation from user B (since users B is one degree of separation from user E, user D is one degree of separation from user D, user F is one degree of separation from user F, and user G is one degree of separation from user F). In the linking diagram illustrated in FIG. 7, a direction of each arrow shown therein is relevant. More specifically, where an arrow points from a first user (e.g., user A) towards a second user (e.g., user B), this means the first user has established an impression (aka an opinion) of the second user, e.g., user A has an opinion of user B. In FIG. 7, while user A is shown as being one degree of separation from user B (and thus, user A is directly linked to user B), there is no reciprocal relationship (i.e., user B is not linked to user A, since user B has not yet established an opinion of user A). For another example, in FIG. 7 user G is shown as being one degree of separation from user F, but user G has no relation to user F (since user G has not yet expressed an opinion about any other user).

Referring again to the flow diagram of FIG. 8, step 810 involves maintaining a record of relative reputation scores associated with at least some (and preferably each) of the plurality of users. Such relative reputation scores can be maintained in one or more tables and/or databases, but is not limited thereto.

Step 812 involves enabling a user (e.g., user A) of the VR environment to access, using the client computing device (e.g., 132a) they are using, a relative reputation score associated with another one of the users of the VR environment. In accordance with certain embodiments, at step 512, whenever user A (or their avatar 304a) looks at the avatar 304b (of user B), the relative reputation score of the user (i.e., user B) associated with the avatar 304b can be automatically displayed to the user A. Similarly, whenever user A (or their avatar 304a) looks at the avatar 304c (of user C), the relative reputation score of the user (i.e., user C) associated with the avatar 304c can be automatically displayed to the user A. The relative reputation score that is automatically displayed can always be displayed, or can just be displayed for a specified amount of time starting at the point at which a user (and/or their avatar) initially sees the avatar(s) of one or more other users. In certain embodiments, a relative reputation score of another use can be automatically displayed to a user when the user is about to perform an interaction (e.g., entering into a financial transaction or some other agreement with the other user) for which it is likely that the user would want to know the reputation score(s) of the other user before confirming they want to proceed with performing the interaction. In certain embodiments, a relative reputation score can be displayed to a user in response to a specified user input (via a user interface of the client computing device being used by user). Such a user input can be a certain button or combination of buttons being pressed, or a specific gesture being made, or a specific selection from a pulldown menu, just to name a few. Where a relative reputations score is automatically displayed to a user for only a brief period of time, the user can thereafter cause the relative reputation score to be redisplayed by selecting a specified user input.

Relative reputations scores can be numeric value within some specified range. For example, the range of numeric value relative reputation scores can be from 0 to 1, from 0 to 4, from 1 to 4, from 0 to 10, from 1 to 10, from 0 to 100, or from 1 to 100, but are not limited thereto. Relative reputation scores need not be numeric values, but can instead be indicated by a quantity of symbols, such as stars, smiley faces, or the like. For example, a relative reputation score can be within the range of zero to four stars. Relative reputation scores can alternatively be color based, e.g., with green representing a high or good relative reputation, yellow representing a medium relative reputation, and red representing a low or bad relative reputation. Other variations are also possible and within the scope of the embodiments described herein. For another example, a relative reputation score can be a binary type score, such as: 0 or 1; "trust" or "don't trust"; or "like" or "don't like", but are not limited thereto.

Referring again to the flow diagram of FIG. 8, step 814 involves enabling a user of the VR environment to control an interaction with another one of the users of the VR environment based on the relative reputation score associated with the other one of the users of the VR environment. For example, assume that user A (associated with the avatar 304a) is considering entering into a financial transaction or some other agreement with user B (associated with the avatar 304b). User A can decide, based on a relative reputation score for user B (that is displayed to user A), whether user A wants to enter into the financial transaction or other agreement with user B. Such a decision can be indicated by user A using a user interface of or associated with the client device (e.g., 132a) being used by user A. For example, if user A observes that user B has a high relative reputation score, then user A may agree to enter into a transaction or other agreement with user B. Conversely, if user A observes that user B has a low relative reputation score, then user A may decide not to enter into a transaction or other agreement with user B. In certain embodiments, user A may have a profile or policy, specified by user A, which indicates that user A will only enter into financial transactions or other agreements with other users that have at least some specified minimum relative reputation score. In this latter embodiment, the financial transaction or other agreement that user A tries to enter into with another user (e.g., user B) would be allowed if the other user (user B) had at least the minimum relative reputation score specified by user A. However, if the other user (user B) did not have at least the minimum relative reputation score specified by user A, the financial transaction or other agreement with the other user (user B) would be automatically blocked from occurring. Rather than automatically blocking the transaction or agreement, a warning can be displayed to user A, which user A can override if they wish. Other variations are also possible and within the scope of the embodiments described herein.

There are other types of interactions with another user that a user can control based on the relative reputation score associated with the other user, including, but not limited to: allowing the other user to enter a secure area (e.g., a virtual home or virtual store) or event (e.g., a virtual meeting, virtual party, or virtual conference); and granting the other user permission to edit a portion of a VR environment; just to name a few.

Referring again to step 808 in FIG. 8, in accordance with certain embodiments, determining for a first user (e.g., user A) the relative reputation score associated with a second user (e.g., user B) can involve weighting of the I2I reputation scores associated with the second user (e.g., user B) that were determined for other users (e.g., users C, D, E, and F) that are linked to both the first and second users (e.g., linked to both users A and B) based on how many degrees of separation there are between the other user(s) (e.g., users C, D, E, and F) and the first user (e.g., user A). In other words, assume that user A is one degree of separation from each of users C and D, and that users A is two degrees of separation from users E and F. In such a case, when determining for user A the relative reputation score associated with user B, the I2I scores that each of users C, D, E, and F have for user B can be combined in a manner such that the I2I scores that users C and D have for user B are weighted greater than the I2I scores that users E and F have for user B, since users C and D are only one degree of separation from user A, while users E and F are two degrees of separation from user A. Various different manners for performing such weightings can be used, some examples of which are described below.

In certain embodiments, the weight applied to a specific I2I score (of multiple I2I scores being combined to provide a relative reputation score) can be 1/N, wherein N corresponds to the degree of separation between the user for which the relative reputation score is being determined (e.g., user A) and the other user (e.g., user C) whose I2I score is being used to generate the relative reputation score associated with another user (e.g., user B). Assume that an instance of step 808 is being performed to determine, for user A, a relative reputation score associated with user B. Also assume that step 808 is performed by weighting of the I2I reputation scores associated with user B that were determined for users C, D, E, and F that are linked to both users A and B. Also assume that user A is one degree of separation from each of users C and D, and that users A is two degrees of separation from users E and F. The weight applied to the I2I score that user C has for user B can be 1/N, which equals 1 since N=1; the weight applied to the I2I score that user D has for user B can be 1/N, which equals 1 since N=1; the weight applied to the I2I score that user E has for user B can be 1/N, which equals ½ since N=2; and the weight applied to the I2I score that user F has for user B can be 1/N, which equals ½ since N=2.

In alternative embodiments, the weight applied to a specific I2I score (of multiple I2I scores being combined to provide a relative reputation score) can be 1/N^2, wherein N corresponds to the degree of separation between the user for which the relative reputation score is being determined (e.g., user A) and the other user (e.g., user C) whose I2I score is being used to generate the relative reputation score associated with another user (e.g., user B). Again assume that an instance of step 808 is being performed to determine, for user A, a relative reputation score associated with user B. Also assume that step 808 is performed by weighting of the I2I reputation scores associated with user B that were determined for users C, D, E, and F that are linked to both users A and B. Also assume that user A is one degree of separation from each of users C and D, and that users A is two degrees of separation from users E and F. The weight applied to the I2I score that user C has for user B can be 1/N^2, which equals 1 since N=1; the weight applied to the I2I score that user D has for user B can be 1/N^2, which equals 1 since N=1; the weight applied to the I2I score that user E has for user B can be 1/N^2, which equals ¼ since N=2; and the weight applied to the I2I score that user F has for user B can be 1/N^2, which equals ¼ since N=2.

Alternatively, or additionally, the weightings of I2I scores that are being combined to produce a relative reputation score of a second user (e.g., user B) for a first user (e.g., user A), can be based on the first user's I2I scores of the other users (e.g., users C, D, E, and F) whose I2I scores are being combined to produce the relative reputation score. For example, if user A's relative reputation score for user C is M times greater than user A's relative reputation score for user D, then user C's I2I score for user B can be weighted greater (e.g., M times as much, or M^2 times as much) than user D's I2I score for user B. Other variations are possible, and within the scope of the embodiments described herein.

The relative reputation score associated with a second user (e.g., user B) of the VR environment, which is determined for a first user (e.g., user A), can also be based on the I2I score that is indicative of user A's impression of user B. In other words, it would also be possible to include in the relative reputation score, user A's I2I reputation score for user B, which can be weighted the greatest, or can be weighted in the same manner as other I2I scores determined for users having only one degree of separation between them and user B.

In the above examples, at step 808, for user A, a relative reputation score was being determined for user B. Once the weightings of the various I2I scores are determined and/or applied, the weighted I2I scores can be combined. This can involve summing the weighted scores and dividing the resulting sum by the number of weighted scores (e.g., four) that were summed.

In accordance with certain embodiments, when determining a relative reputation score of a second user (e.g., user B) for a first user (e.g., user A), one or more I2I scores that were more recently determined and/or updated can be weighted greater than one or more I2I scores that were determined and/or last updated a long time ago (e.g., at least 30 days, or some other period of time ago), e.g., in order to weight a user's more recent interactions with others more than the user's long ago interactions. There are various different manners in which this goal can be accomplished. For example, certain embodiments involve gradually decaying over time an I2I reputation score indicative of a user's impression of another user of the VR environment, in response to determining that the user has not interacted with the other user within the VR environment for at least a specified threshold period of time. Other variations are possible, and within the scope of the embodiments described herein.

By determining and providing relative reputation scores to users of a VR environment, this makes it more difficult for a user to conspire with their own friends to rig the system by having their own friends corroborate fake interactions with other users. Exemplary interactions that can be corroborated or contradicted will be described below.

Use of Corroborating or Contradicting Information

Certain embodiments of the present technology reduce the probability that a user can nefariously rig a system to positively influence (e.g., increase) and/or negative influence (e.g., decrease) another user's reputation score. For an example, a first user may be able to hack into a system supporting a VR environment to attempt to increase a second user's reputation score by generating fake indications that first user made positive gestures towards the second user. This can happen, for example, because the first and second users conspired to inflate one another's reputation scores. For a more specific example, referring back to FIG. 3, it may be possible for user A (corresponding to the avatar 304*a*) to generate fake indications that user A (or their avatar 304*a*) made numerous positive gestures (e.g., nodded their heads ten times) toward user B (corresponding to avatar 304*b*), when in fact such positive gestures never occurred.

For another example, a first user (e.g., user A) may be able to hack into a system supporting a VR environment to purposely attempt to reduce the reputation score of a second user (e.g., user B) by generating fake indications that the first user (e.g., user A) made negative gestures towards the second user (e.g., user B). For a more specific example, referring back to FIG. 3, it may be possible for user A (corresponding to the avatar 304*a*) to generate fake indications that user A (corresponding to the avatar 304A) made numerous negative gestures towards user B (corresponding to the avatar 304*b*), when in fact such negative gestures never occurred.

In accordance with certain embodiments, such fake indications can be essentially voided, or possibly used to reduce the nefarious user's reputation score. More specifically, in accordance with certain embodiments, such fake indications can be identified and/or ignored where there is either no information to corroborate such fake indications, or where there is information that contradicts such fake indications. As will can be appreciated from the description below, non-corroborating or contradicting information can be obtained from one or more user's whose avatars are within a specified proximity to avatars of users that send such fake indications. Certain such embodiments are summarized below with reference to the high level flow diagram of FIG. 9.

Figure 9:
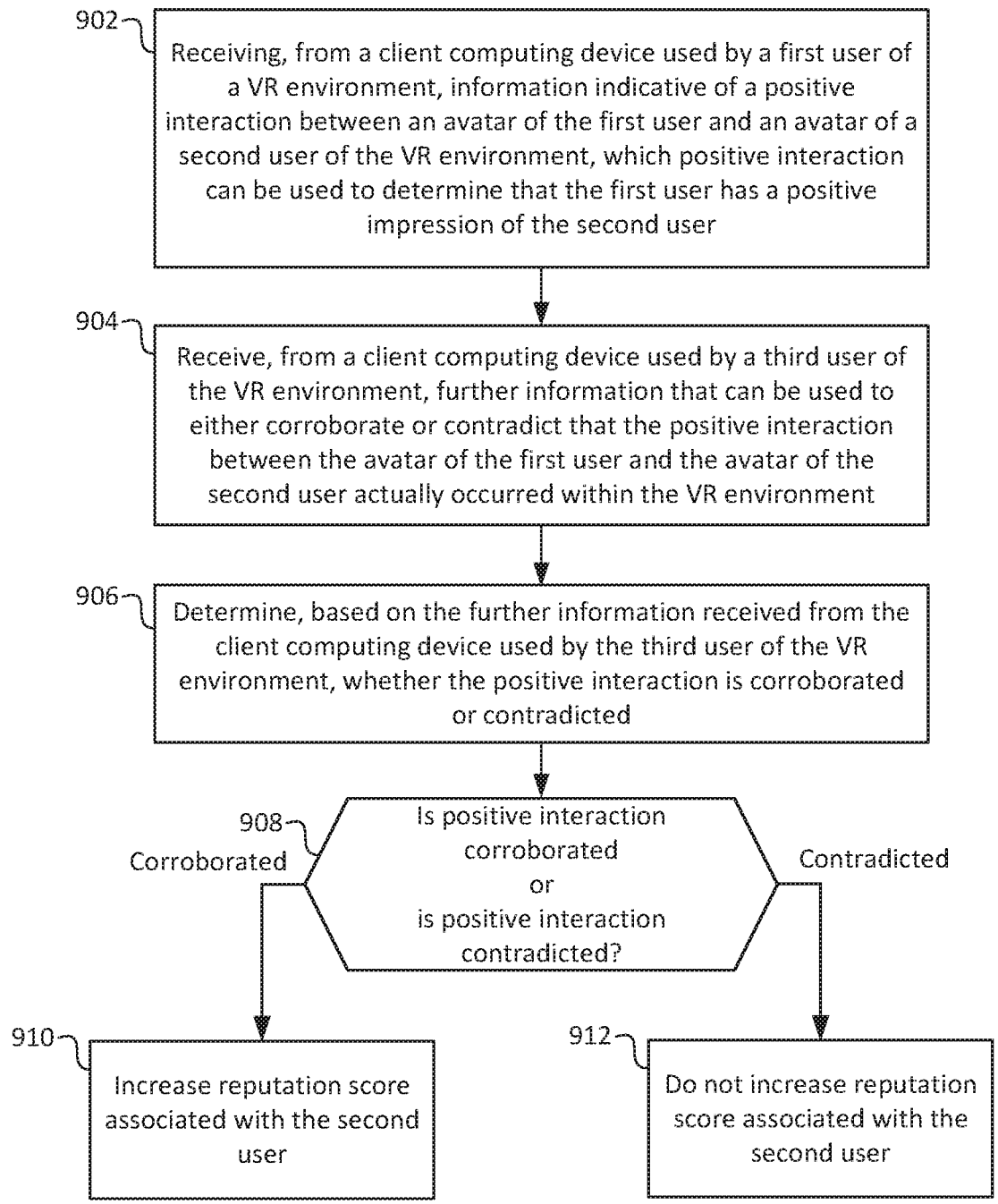
FIG. 9 is a high level flow diagram that is used to describe how information indicative of positive interactions between avatars in a computer implemented VR environment can be corroborated or contradicted by one or more others users associated with other avatars of the VR environment.

Referring to FIG. 9, summarized therein are certain methods for use with a computer implemented VR environment that enables users of the VR environment to explore the VR environment and interact with one another within the VR environment using client computing devices that are being used by the users. Step 902 involves receiving, from a client computing device used by a first user of the VR environment, information indicative of a positive interaction between an avatar of the first user and an avatar of a second user of the VR environment, which positive interaction can be used to determine that the first user has a positive impression of the second user. For example, referring briefly back to FIG. 3, at step 902 information can be received that is indicative of a positive interaction between an avatar (e.g., 304a) of a first user (e.g., user A) and an avatar (e.g., 304b) of a second user (e.g., user B), which positive interaction can be used to determine that the first user has a positive impression of the second user.

Referring again to FIG. 9, step 904 involves receiving, from a client computing device used by a third user of the VR environment, further information that can be used to either corroborate or contradict that the positive interaction between the avatar of the first user and the avatar of the second user actually occurred within the VR environment. For example, referring again briefly back to FIG. 3, at step 904 information can be received from a user C associated with the avatar 304c, because the avatar 304c is observing the interaction between the avatars 304b and 304a. Additionally or alternatively, at step 904 information can be received from a user D associated with the avatar 304d, because the avatar 304d is also observing the interaction between the avatars 304c and 304a. In accordance with certain embodiments, there can be a determination that a third avatar (e.g., 304c) is observing a positive interaction between first and second avatars (e.g., 304a and 304b) where the third avatar (e.g., 304c) is within a specified distance of the first and second avatars (e.g., 304a and 304b), the third avatar is facing the first and second avatars (e.g., 304a and 304b), and the first and second avatars (e.g., 304a and 304b) are not blocked from the view of the third avatar (e.g., 304a) by an intervening virtual object (e.g., a virtual wall). In other words, there can be a determination that a third avatar (e.g., 304c) is observing the positive interaction between first and second avatars (e.g., 304a and 304b) where pixels corresponding to the first and second avatars are visible to the third avatar. In certain embodiments, a client device of a user can only corroborate or contradict positive interactions between other avatars where the other avatars are visible to the user and/or their avatar.

Referring again to FIG. 9, step 906 involves determining, based on the further information received from the client computing device used by the third user (e.g., user C, and/or user D) of the VR environment, whether the positive interaction is corroborated or contradicted by the further information. As indicated at steps 908 and 910, in response to determining that the positive interaction is corroborated, a reputation score associated with the second user (e.g., user B) of the VR environment is increased. As indicated at steps 908 and 912, if instead the positive interaction is contradicted, a reputation score associated with the second user of the VR environment is not increased. Additionally, a reputation score associated with the first user of the VR environment can be reduced at step 912 (or a separate step), if the positive interaction is contradicted, in order to dissuade users from trying to rig the system.

In accordance with certain embodiments, the information received at step 902, which is indicative of the positive interaction between the avatar (e.g., 304a) of the first user (e.g., user A) and the avatar (e.g., 304b) of the second user (e.g., user B) can be information indicative of a positive gesture that the avatar of the first user made towards the avatar of the second user. In such embodiments, the further information received at step 904, which can be used to either corroborate or contradict that the positive interaction between the avatar (e.g., 304a) of the first user (e.g., user A) and the avatar (e.g., 304b) of the second user (user B) actually occurred within the VR environment, can be information indicative of whether the third user (e.g., user C), or their avatar (e.g., 304c), witnessed the avatar (e.g., 304a) of the first user (e.g., user A) making the positive gesture towards the avatar (e.g., 304b) of the second user (e.g., user B). As was explained above, exemplary positive gestures that can be performed by the avatar 304a towards the avatar 304b, and which can be witnessed by the avatar 304c (or its associated user C) can include, but are not limited to, nodding, thumbs up, hand shaking, clapping, and waving. In certain embodiments, information indicative of a positive interaction between the avatar (e.g., 304a) of the first user (e.g., user A) and the avatar (e.g., 304b) of the second user (e.g., user B) can alternatively or additionally be information indicative of the first user using a keyboard, pulldown menu, or some other user interface to positively rate the second user, wherein that rating is shown in a messaging channel or thread that is shown to one or more other users that are in the vicinity of the two interacting users. This can also enable such specifying and/or modifying of a reputation rating to be corroborated or contradicted by other users that witness the interaction.

Figure 10:
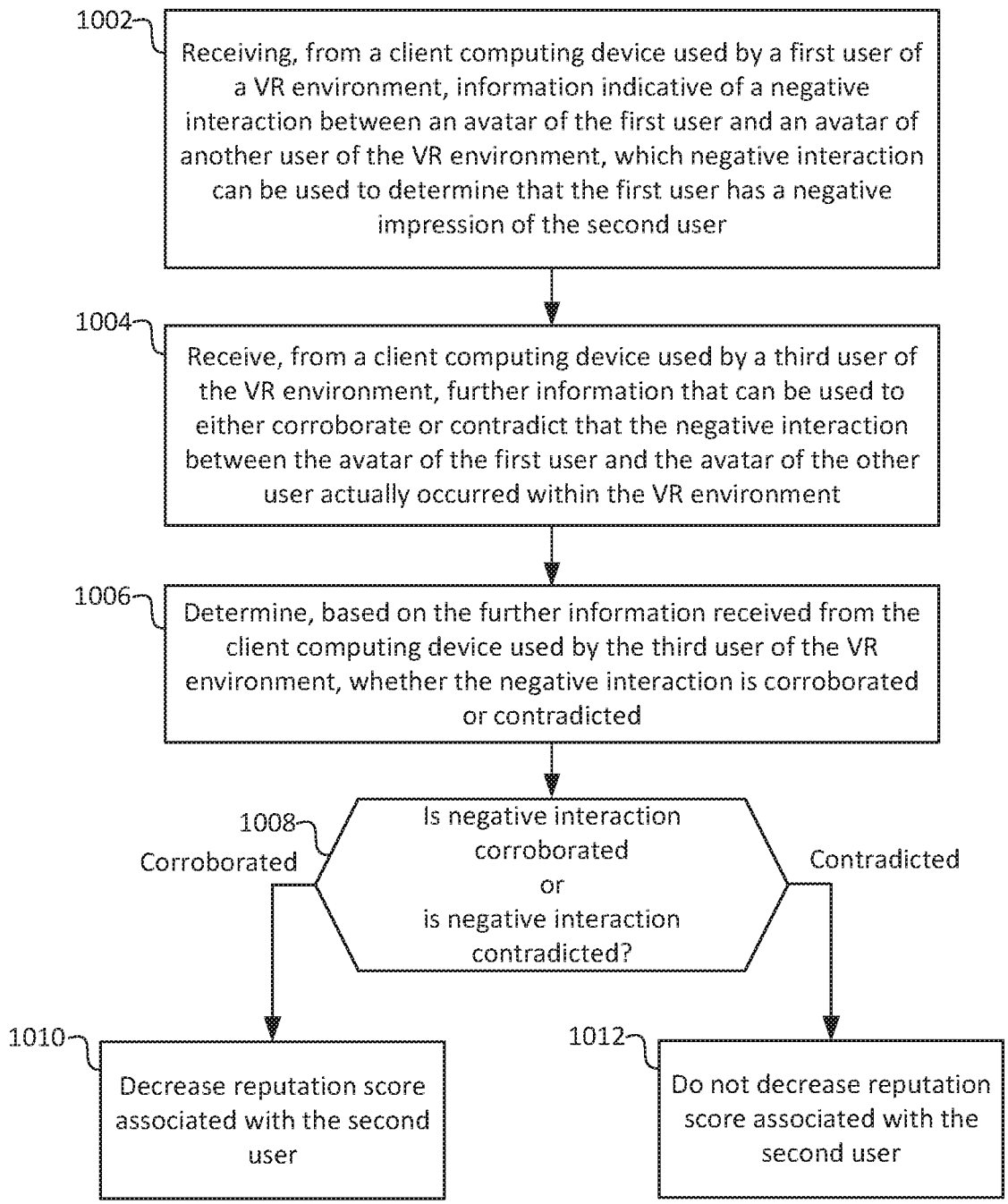
FIG. 10 is a high level flow diagram that is used to describe how information indicative of negative interactions between avatars in a computer implemented VR environment can be corroborated or contradicted by one or more others users associated with other avatars of the VR environment.

Instead of (or in addition to) corroborating or contradicting positive interactions between avatars and adjusting (or not adjusting) reputations scores accordingly, embodiments of the present technology can be used to corroborate or contradict negative interactions between avatars and adjusting (or not adjusting) reputations scores accordingly, as will now be described with reference to the high level flow diagram of FIG. 10. Referring to FIG. 10, step 1002 involves receiving, from a client computing device used by a first user (e.g., user A) of the VR environment, information indicative of a negative interaction between an avatar (e.g., 304a) of the first user (e.g., user A) and an avatar (e.g., 304c) of another user (e.g., user C) of the VR environment, which negative interaction can be used to determine that the first user (e.g., user A) has a negative impression of the other user (e.g., user C). Step 1004 involves receiving, from a client computing device used by a further user (e.g., user D) of the VR environment, further information that can be used to either corroborate or contradict that the negative interaction between the avatar (e.g., 304a) of the first user (e.g., user A) and the avatar (e.g., 304c) of the other user (e.g., user C) actually occurred within the VR environment. Step 1006 involves determining, based on the further information received from the client computing device used by the further user (e.g., user D) of the VR environment, whether the negative interaction is corroborated or contradicted. As indicated by steps 1008 and 1010, in response to determining that the negative interaction is corroborated, a reputation score associated with the other user (e.g., user C) of the VR environment is decreased. As indicated at steps 1008 and 1012, if instead the negative interaction is contradicted, a reputation score associated with the other user (e.g., user C) of the VR environment is not decreased. As was explained above, exemplary negative gestures that can be performed by one user or their avatar, towards the avatar of another user, can include, but are not limited to, shaking one's head side to side (which is a "no" gesture), or giving a thumbs down, but is not limited thereto. In certain embodiments, information indicative of a negative interaction between the avatar (e.g., 304a) of a first user (e.g., user A) and the avatar (e.g., 304b) of a second user (e.g., user B) can alternatively or additionally be information indicative of the first user using a keyboard, pulldown menu, or some other user interface to negative rate the second user, wherein that rating is shown in a messaging channel or thread that is shown to one or more other users that are in the vicinity of the two interacting users. This can also enable such specifying and/or modifying of a reputation rating to be corroborated or contradicted by other users that witness the interaction.

In accordance with certain embodiments, there can be a determination that a third avatar (e.g., 304c) is observing a positive or negative interaction between first and second avatars (e.g., 304a and 304b) where the third avatar (e.g., 304c) is within a specified distance of the first and second avatars (e.g., 304a and 304b), the third avatar is facing the first and second avatars (e.g., 304a and 304b), and the first and second avatars (e.g., 304a and 304b) are not blocked from the view of the third avatar (e.g., 304a) by an intervening virtual object (e.g., a virtual wall). In other words, there can be a determination that a third avatar (e.g., 304c) is observing a positive or negative interaction between first and second avatars (e.g., 304a and 304b) where pixels corresponding to the first and second avatars are visible to the third avatar. In certain embodiments, a client device of a user can only corroborate or contradict positive or negative interactions between other avatars where the other avatars are visible to the user and/or their avatar.

In accordance with certain embodiments, the reputation score that is increased, not increased, or decreased, at steps 910, 912, 1010, or 1012 can be an individual-to-individual (I2I) reputation score that is indicative of the one user's impression of another user. In certain embodiments, such an I2I reputation score can be used to determine one or more relative reputation scores. Additional details of how I2I reputation scores can be determined, and how relative reputation scores can be determined based on I2I reputation scores, were described above, and thus, need not be repeated. The reputation score that is increased, not increased, or decreased, at steps 910, 912, 1010, or 1012 can be accessed by one or more users of the VR environment, using the respective client computing device they are using, the reputation score associated with the second user of the VR environment, and can be used to control an interaction within the VR environment.

The embodiments described above with reference to the flow diagrams of FIGS. 5 and 6 can be combined with the embodiments described above with reference to the flow diagrams of FIGS. 7 and 8, and/or with the embodiments described above with reference to the flow diagrams of FIGS. 9 and 10. The embodiments described above with reference to the flow diagrams of FIGS. 7 and 8 can be combined with the embodiments described above with reference to the flow diagrams of FIGS. 5 and 6, and/or with the embodiments described above with reference to the flow diagrams of FIGS. 9 and 10. The embodiments described above with reference to the flow diagrams of FIGS. 9 and 10 can be combined with the embodiments described above with reference to the flow diagrams of FIGS. 5 and 6, and/or with the embodiments described above with reference to the flow diagrams of FIGS. 7 and 8. More generally, the various embodiments of the present technology described herein can be used alone or in combination with one or more of the other embodiments described herein.

The term VR environment refers to a computer-generate environment that generally (but in some cases may not) behave in ways that follow a user's expectations for a real-world environment. One or more computing devices that are used to produce the VR environment can be termed a VR system, and the creation of the VR environment by the VR system can be termed rendering the VR environment. As explained above, a VR environment may include an avatar, which is in this context is an entity belonging to the VR environment that has a point of perception in the VR environment. The VR system may render the virtual environment for the avatar as perceived from the avatar's point of perception. As was described above, a user of a VR environment may be associated with a particular avatar in the VR environment.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage.

A computer program may be stored or distributed on a suitable medium, such as an optical storage medium or a solid-state medium supplied together with, or as part of, other hardware, but may also be distributed in other forms, such as via the Internet or other wired or wireless telecommunication systems.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the above detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations in (e.g., in FIGS. 5, 6, 8, 9 and 10) and/or block diagrams (e.g., in FIGS. 1 and 2), and combinations of blocks in the flowchart illustrations and/or block diagrams, can be implemented by computer program instructions. These computer program instructions may be provided to one or more processors of a general purpose computer, special purpose computer, or other programmable data processing apparatus to produce a machine, such that the instructions, which execute via the processor(s) of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects. Similarly, a "first" user, a "second" user, and a "third" user may not imply an ordering of users, but may instead be used for identification purposes to identify different users.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed is:

1. A method for use with a computer implemented virtual reality (VR) environment that enables users of the VR environment to explore the VR environment and interact with one another within the VR environment using client computing devices that are being used by the users, the method comprising:
    (a) receiving, from a client computing device used by a first user of the VR environment, information indicative of a positive gesture that an avatar of the first user made towards an avatar of a second user of the VR environment, which positive gesture is indicative of the first user having a positive impression of the second user,
        wherein the positive gesture is selected from the group consisting of nodding, thumbs up, hand shaking, clapping, and waving;
    (b) receiving, from a client computing device used by a third user of the VR environment, further information that is used to either corroborate or contradict that the avatar of the first user actually made the positive gesture towards the avatar of the second user within the VR environment,
        wherein the further information, which is used to either corroborate or contradict that the avatar of the first user actually made the positive gesture towards the avatar of the second user within the VR environment, comprises objective information indicative of whether the third user, or an avatar of the third user, objectively witnessed the avatar of the first user making the positive gesture towards the avatar of the second user while the positive gesture was actually occurring;
    (c) determining, based on the further information received from the client computing device used by the third user of the VR environment, that the positive gesture is corroborated;
    (d) in response to determining that the positive gesture is corroborated, increasing a reputation score associated with the second user of the VR environment; and
    (e) enabling each of one or more users of the VR environment to access, using the client computing device they are using, the reputation score associated with the second user of the VR environment;
        wherein in order for the third user, or the avatar of the third user, to witness the avatar of the first user actually making the positive gesture towards the avatar of the second user, the avatar of the third user is within a specified distance of the avatars of the first and second users within the VR environment while the avatar of the first user makes the positive gesture towards the avatar of the second user, the avatar of the third user is facing the avatars of the first and second users while the avatar of the first user makes the positive gesture towards the avatar of the second user, and the avatars of the first and second users are not blocked from the view of the avatar of the third user by an intervening virtual object while the avatar of the first user makes the positive gesture towards the avatar of the second user.

2. The method of claim 1, wherein the reputation score associated with the second user of the VR environment, that is increased at step (d) comprises an individual-to-individual (I2I) reputation score that is indicative of the first user's impression of the second user, the method further comprising:
- (f) for a further user of the VR environment, whose avatar interacts with the avatar of the second user of the VR environment,
  - (f.1) determining a relative reputation score associated with a second user of the VR environment, wherein the relative reputation score is determined based on one or more I2I reputation scores associated with the second user that were determined for other users that are linked to both the further user and the second user of the VR environment; and
  - (f.2) enabling the further user of the VR environment to access, using the client computing device being used by the further user, the relative reputation score associated with the second user of the VR environment.

3. A method for use with a computer implemented virtual reality (VR) environment that enables users of the VR environment to explore the VR environment and interact with one another within the VR environment using client computing devices that are being used by the users, the method comprising:
- (a) receiving, from a client computing device used by a first user of the VR environment, information indicative of a negative gesture that an avatar of the first user made towards an avatar of a second user of the VR environment, which negative gesture is indicative of the first user having a negative impression of the second user,
  - wherein the negative gesture is selected from the group consisting of shaking a head side to side and a thumbs down;
- (b) receiving, from a client computing device used by a third user of the VR environment, further information that is used to either corroborate or contradict that the avatar of the first user actually made the negative gesture towards the avatar of the second user within the VR environment,
  - wherein the further information, which is used to either corroborate or contradict that the avatar of the first user actually made the negative gesture towards the avatar of the second user within the VR environment, comprises objective information indicative of whether the third user, or an avatar of the third user, objectively witnessed the avatar of the first user making the negative gesture towards the avatar of the second user while the negative gesture was actually occurring;
- (c) determining, based on the further information received from the client computing device used by the third user of the VR environment, that the negative gesture is corroborated;
- (d) in response to determining that the negative gesture is corroborated, decreasing a reputation score associated with the second user of the VR environment;
- (e) enabling each of one or more users of the VR environment to access, using the client computing device they are using, the reputation score associated with the second user of the VR environment;
  - wherein in order for the third user, or the avatar of the third user, to witness the avatar of the first user actually making the negative gesture towards the avatar of the second user, the avatar of the third user is within a specified distance of the avatars of the first and second users within the VR environment while the avatar of the first user makes the negative gesture towards the avatar of the second user, the avatar of the third user is facing the avatars of the first and second users while the avatar of the first user makes the negative gesture towards the avatar of the second user, and the avatars of the first and second users are not blocked from the view of the avatar of the third user by an intervening virtual object while the avatar of the first user makes the negative gesture towards the avatar of the second user.

4. One or more processor readable storage devices having instructions encoded thereon which when executed cause one or more processors to perform a method for use with a virtual reality (VR) environment in which users can explore the VR environment and interact with one another within the VR environment using client computing devices that are being used by the users, the method comprising:
- (a) receiving, from a client computing device used by a first user of the VR environment, information indicative of a positive gesture that an avatar of the first user made towards an avatar of a second user of the VR environment, which positive gesture is indicative of the first user having a positive impression of the second user,
  - wherein the positive gesture is selected from the group consisting of nodding, thumbs up, hand shaking, clapping, and waving;
- (b) receiving, from a client computing device used by a third user of the VR environment, further information that is used to either corroborate or contradict that the avatar of the first user actually made the positive gesture towards the avatar of the second user within the VR environment,
  - wherein the further information, which is used to either corroborate or contradict that the avatar of the first user actually made the positive gesture towards the avatar of the second user within the VR environment, comprises objective information indicative of whether the third user, or an avatar of the third user, objectively witnessed the avatar of the first user making the positive gesture towards the avatar of the second user while the positive gesture was actually occurring;
- (c) determining, based on the further information received from the client computing device used by the third user of the VR environment, that the positive gesture is corroborated;
- (d) in response to determining that the positive gesture is corroborated, increasing a reputation score associated with the second user of the VR environment; and
- (e) enabling each of one or more users of the VR environment to access, using the client computing device they are using, the reputation score associated with the second user of the VR environment;
  - wherein in order for the third user, or the avatar of the third user, to witness the avatar of the first user actually making the positive gesture towards the avatar of the second user, the avatar of the third user is within a specified distance of the avatars of the first and second users within the VR environment while the avatar of the first user makes the positive gesture towards the avatar of the second user, the avatar of the third user is facing the avatars of the first and second users while the avatar of the first user makes the positive gesture towards the avatar of the second user, and the avatars of the first and second users are not blocked from the view of the avatar of the third user by an intervening virtual object while the avatar of the first user makes the positive gesture towards the avatar of the second user.

5. The one or more processor readable storage devices of claim 4, wherein the reputation score associated with the second user of the VR environment, that is increased at step (d) comprises an individual-to-individual (I2I) reputation score that is indicative of the first user's impression of the second user, the method further comprising:
(f) for a further user of the VR environment, whose avatar interacts with the avatar of the second user of the VR environment,
  (f.1) determining a relative reputation score associated with a second user of the VR environment, wherein the relative reputation score is determined based on one or more I2I reputation scores associated with the second user that were determined for other users that are linked to both the further user and the second user of the VR environment; and
  (f.2) enabling the further user of the VR environment to access, using the client computing device being used by the further user, the relative reputation score associated with the second user of the VR environment.

6. One or more processor readable storage devices having instructions encoded thereon which when executed cause one or more processors to perform a method for use with a virtual reality (VR) environment in which users can explore the VR environment and interact with one another within the VR environment using client computing devices that are being used by the users, the method comprising:
(a) receiving, from a client computing device used by a first user of the VR environment, information indicative of a negative gesture that an avatar of the first user made towards an avatar of a second user of the VR environment, which negative gesture is indicative of the first user having a negative impression of the second user,
  wherein the negative gesture is selected from the group consisting of shaking a head side to side and a thumbs down;
(b) receiving, from a client computing device used by a third user of the VR environment, further information that is used to either corroborate or contradict that the avatar of the first user actually made the negative gesture towards the avatar of the second user within the VR environment,
  wherein the further information, which is used to either corroborate or contradict that the avatar of the first user actually made the negative gesture towards the avatar of the second within the VR environment, comprises objective information indicative of whether the third user, or an avatar of the third user, objectively witnessed the avatar of the first user making the negative gesture towards the avatar of the second user while the negative gesture was actually occurring;
(c) determining, based on the further information received from the client computing device used by the third user of the VR environment, that the negative gesture is corroborated;
(d) in response to determining that the negative gesture is corroborated, decreasing a reputation score associated with the second user of the VR environment;
(e) enabling each of one or more users of the VR environment to access, using the client computing device they are using, the reputation score associated with the second user of the VR environment;
  wherein in order for the third user, or the avatar of the third user, to witness the avatar of the first user actually making the negative gesture towards the avatar of the second user, the avatar of the third user is within a specified distance of the avatars of the first and second users within the VR environment while the avatar of the first user makes the negative gesture towards the avatar of the second user, the avatar of the third user is facing the avatars of the first and second users while the avatar of the first user makes the negative gesture towards the avatar of the second user, and the avatars of the first and second users are not blocked from the view of the avatar of the third user by an intervening virtual object while the avatar of the first user makes the negative gesture towards the avatar of the second user.

7. A system for supporting a computer implemented virtual reality (VR) environment in which users of the VR environment can explore the VR environment and interact with one another within the VR environment using client computing devices that are being used by the users, the system comprising:
  a memory storing instructions;
  one or more hardware processors coupled to the memory and configured to receive, from a client computing device used by a first user of the VR environment, information indicative of a positive or negative gesture that an avatar of the first user made towards an avatar of a second user of the VR environment, which positive or negative gesture is used to determine whether the first user has a positive or negative impression of the second user,
    wherein the positive gesture is selected from the group consisting of nodding, thumbs up, hand shaking, clapping, and waving, and
    wherein the negative gesture is selected from the group consisting of shaking a head side to side and a thumbs down;
  the one or more hardware processors also configured to receive, from a client computing device used by a third user of the VR environment, further information that is used to either corroborate or contradict that the avatar of the first user actually made the positive or negative gesture towards the avatar of the second user within the VR environment,
    wherein the further information, which is used to either corroborate or contradict that the avatar of the first user actually made the positive or negative gesture towards the avatar of the second user within the VR environment, comprises objective information indicative of whether the third user, or an avatar of the third user, objectively witnessed the avatar of the first user making the positive or negative gesture towards the avatar of the second user while the positive or negative gesture was actually occurring;
  the one or more hardware processors also configured to determine, based on the further information received from the client computing device used by the third user of the VR environment, that the positive or negative gesture is corroborated;
  the one or more hardware processors also configured to adjust a reputation score associated with the second user of the VR environment, in response to a determination that the positive or negative gesture is corroborated; and the one or more hardware processors also configured to enable each of one or more users of the VR environment to access, using the client computing device they are using, the reputation score associated with the second user of the VR environment;

wherein in order for the third user, or the avatar of the third user, to witness that avatar of the first user actually making the positive or negative gesture towards the avatar of the second, the avatar of the third user is within a specified distance of the avatars of the first and second users within the VR environment while the avatar of the first user makes the positive or negative gesture towards the avatar of the second user, the avatar of the third user is facing the avatars of the first and second users while the avatar of the first user makes the positive or negative gesture towards the avatar of the second user, and the avatars of the first and second users are not blocked from the view of the avatar of the third user by an intervening virtual object while that avatar of the first users makes the positive or negative gesture towards the avatar of the second user.

8. The system of claim 7, wherein:

the reputation score associated with the second user of the VR environment, that is increased, not increased, or decreased, comprises an individual-to-individual (I2I) reputation score that is indicative of the first user's impression of the second user;

the one or more hardware processors are also configured to determine, for a further user of the VR environment, whose avatar interacts with the avatar of the second user of the VR environment, a relative reputation score associated with the second user of the VR environment, wherein the relative reputation score is determined based on one or more I2I reputation scores associated with the second user that were determined for other users that are linked to both the further user and the second user of the VR environment; and the one or more hardware processors are also configured to enable the further user of the VR environment to access, using the client computing device being used by the further user, the relative reputation score associated with the second user of the VR environment.

* * * * *

UNITED STATES PATENT AND TRADEMARK OFFICE
CERTIFICATE OF CORRECTION

PATENT NO. : 10,924,566 B2
APPLICATION NO. : 15/983425
DATED : February 16, 2021
INVENTOR(S) : Rosedale Page 1 of 1

It is certified that error appears in the above-identified patent and that said Letters Patent is hereby corrected as shown below:

In the Claims

Column 31, Line 44, Claim 3, Line 26: After "second" and before "within", insert -- user --.

Column 33, Line 52, Claim 6, Line 27: After "second" and before "within", insert -- user --.

Signed and Sealed this
First Day of March, 2022

Drew Hirshfeld
*Performing the Functions and Duties of the
Under Secretary of Commerce for Intellectual Property and
Director of the United States Patent and Trademark Office*